US012551312B2

(12) United States Patent
Shelton, IV et al.

(10) Patent No.: US 12,551,312 B2
(45) Date of Patent: Feb. 17, 2026

(54) AUTONOMOUS ADAPTATION OF SURGICAL DEVICE CONTROL ALGORITHM

(71) Applicant: Cilag GmbH International, Zug (CH)

(72) Inventors: Frederick E. Shelton, IV, Hillsboro, OH (US); Matthew David Cowperthwait, Cincinnati, OH (US); Nicholas James Ross, Franklin, OH (US); Curtis Anthony Maples, Cincinnati, OH (US)

(73) Assignee: Cilag GmbH International, Zug (CH)

( * ) Notice: Subject to any disclaimer, the term of this patent is extended or adjusted under 35 U.S.C. 154(b) by 643 days.

(21) Appl. No.: 17/747,763

(22) Filed: May 18, 2022

(65) Prior Publication Data
US 2023/0397969 A1    Dec. 14, 2023

(51) Int. Cl.
*G06Q 10/00*    (2023.01)
*A61B 34/00*    (2016.01)
(Continued)

(52) U.S. Cl.
CPC ............ *A61B 90/361* (2016.02); *A61B 34/25* (2016.02); *G16H 20/40* (2018.01); *G16H 40/60* (2018.01)

(58) Field of Classification Search
CPC ....... A61B 90/361; A61B 34/25; G16H 20/40
See application file for complete search history.

(56) References Cited

U.S. PATENT DOCUMENTS 9,345,481 B2    5/2016  Hall et al.
10,881,399 B2   1/2021  Shelton, IV et al.
(Continued)

FOREIGN PATENT DOCUMENTS

EP    1854420 A1    11/2007
EP    3231373 A1    10/2017
(Continued)

OTHER PUBLICATIONS

Kazanzides, P et al., "Force sensing and 1-40 control for a surgical robot", Proceedings of The International Conference on Robotics and Automation Nice, France, May 12-14, 1992, pp. 612-617.

*Primary Examiner* — Rajesh Khattar
(74) *Attorney, Agent, or Firm* — Condo Roccia Koptiw LLP

(57) ABSTRACT

A computing system may receive first operation data associated with a first surgical procedure and second operation data associated with a second surgical procedure. The computing system receive first outcome data associated with the first surgical procedure and second outcome data associated with the second surgical procedure. The computing system determine that each of the control algorithm of the first surgical device and the control algorithm of the second surgical device is an up-to-date control algorithm associated with the first surgical device type. The computing system generate first aggregation data based on at least the first operation data, the second operation data, the first outcome data, and the second outcome data. Based on the first aggregation data, the computing system determine a correlation between a first aspect of the up-to-date control algorithm and outcome data. Based on the determined correlation, the computing system generate an updated up-to-date control algorithm.

18 Claims, 13 Drawing Sheets

(51) Int. Cl.
  *A61B 90/00* (2016.01)
  *G16H 20/40* (2018.01)
  *G16H 40/60* (2018.01)

(56) References Cited

U.S. PATENT DOCUMENTS

| | | | |
|---|---|---|---|
| 11,464,590 B1 | 10/2022 | Roh et al. | |
| 11,471,227 B1 | 10/2022 | Roh et al. | |
| 11,589,888 B2 | 2/2023 | Shelton, IV et al. | |
| 11,617,492 B2 | 4/2023 | Refai et al. | |
| 12,144,561 B2 * | 11/2024 | Shelton, IV | G16H 40/63 |
| 2014/0263552 A1 | 9/2014 | Hall et al. | |
| 2015/0057675 A1 | 2/2015 | Akeel et al. | |
| 2017/0296213 A1 | 10/2017 | Swensgard et al. | |
| 2019/0200844 A1 | 7/2019 | Shelton, IV et al. | |
| 2019/0200981 A1 | 7/2019 | Harris et al. | |
| 2019/0201046 A1 | 7/2019 | Shelton, IV et al. | |
| 2019/0201047 A1 | 7/2019 | Yates et al. | |
| 2019/0201137 A1 | 7/2019 | Shelton, IV et al. | |
| 2019/0201140 A1 | 7/2019 | Yates et al. | |
| 2019/0206542 A1 | 7/2019 | Shelton, IV et al. | |
| 2019/0206562 A1 | 7/2019 | Shelton, IV et al. | |
| 2019/0206569 A1 | 7/2019 | Shelton, IV et al. | |
| 2019/0231220 A1 | 8/2019 | Refai et al. | |
| 2020/0281670 A1 | 9/2020 | Moskowitz et al. | |
| 2020/0373013 A1 * | 11/2020 | Cao | G06T 7/0014 |
| 2020/0405403 A1 | 12/2020 | Shelton, IV et al. | |
| 2021/0205031 A1 | 7/2021 | Shelton, IV et al. | |
| 2021/0298795 A1 | 9/2021 | Bowling et al. | |
| 2021/0322017 A1 | 10/2021 | Shelton, IV et al. | |
| 2021/0370790 A1 | 12/2021 | Feldman | |
| 2021/0393337 A1 | 12/2021 | Zucker | |
| 2022/0008221 A1 * | 1/2022 | Zucker | A61F 2/442 |
| 2022/0108789 A1 | 4/2022 | Shelton, IV et al. | |
| 2022/0233119 A1 | 7/2022 | Shelton, IV et al. | |
| 2022/0354347 A1 | 11/2022 | Nishimura et al. | |
| 2023/0028059 A1 * | 1/2023 | Shelton, IV | G06F 16/211 |
| 2023/0098670 A1 * | 3/2023 | Shelton, IV | A61B 1/0638 606/21 |
| 2023/0101192 A1 * | 3/2023 | Shelton, IV | A61B 1/07 600/109 |
| 2023/0101714 A1 * | 3/2023 | Shelton, IV | A61B 34/30 600/109 |
| 2023/0101750 A1 * | 3/2023 | Shelton, IV | A61B 18/1442 606/41 |
| 2023/0101757 A1 * | 3/2023 | Hassan | G01B 11/026 |
| 2023/0102358 A1 * | 3/2023 | Shelton, IV | A61B 90/30 600/426 |
| 2023/0103005 A1 * | 3/2023 | Shelton, IV | A61B 90/361 600/424 |
| 2023/0371950 A1 | 11/2023 | Shelton, IV et al. | |
| 2023/0371968 A1 * | 11/2023 | Shelton, IV | G16H 20/40 |
| 2023/0372012 A1 | 11/2023 | Harris et al. | |
| 2023/0372013 A1 | 11/2023 | Shelton, IV et al. | |
| 2023/0372030 A1 | 11/2023 | Shelton, IV et al. | |
| 2023/0372031 A1 | 11/2023 | Shelton, IV | |
| 2023/0377709 A1 * | 11/2023 | Shelton, IV | G16H 40/20 |
| 2023/0377726 A1 | 11/2023 | Shelton, IV et al. | |
| 2023/0397969 A1 | 12/2023 | Shelton, IV et al. | |
| 2023/0404691 A1 | 12/2023 | Shelton, IV et al. | |

FOREIGN PATENT DOCUMENTS

| | | |
|---|---|---|
| EP | 3506287 A1 | 7/2019 |
| WO | 2018142277 A1 | 8/2018 |
| WO | 2019117926 A1 | 6/2019 |
| WO | 2021049438 A1 | 3/2021 |

\* cited by examiner

AUTONOMOUS ADAPTATION OF SURGICAL DEVICE CONTROL ALGORITHM

CROSS-REFERENCE TO RELATED APPLICATIONS

This application is related to the following, filed contemporaneously, the contents of each of which are incorporated by reference herein:

U.S. patent application, entitled METHOD OF CONTROLLING AUTONOMOUS OPERATIONS IN A SURGICAL SYSTEM.

U.S. patent application, entitled ADAPTED AUTONOMY FUNCTIONS AND SYSTEM INTERCONNECTIONS.

BACKGROUND

Surgical procedures are typically performed in surgical operating theaters or rooms in a healthcare facility such as, for example, a hospital. Various surgical devices and systems are utilized in performance of a surgical procedure. In the digital and information age, medical systems and facilities are often slower to implement systems or procedures utilizing newer and improved technologies due to patient safety and a general desire for maintaining traditional practices.

SUMMARY

Systems, methods, and instrumentalities are described herein for autonomous adaptation of surgical device control algorithm. A computing system for autonomous surgical device control algorithm adaptation may include a processor. The processor may be configured to perform one or more actions. The processor may be configured to receive first operation data associated with a first surgical procedure and second operation data associated with a second surgical procedure. In some examples, the first operation data is associated with a first aspect of a control algorithm of a first surgical device. In some examples, the second operation data is associated with a first aspect of a control algorithm of a second surgical device, and the first surgical device and second surgical device are of a first surgical device type. The processor is configured to receive first outcome data associated with the first surgical procedure and second outcome data associated with the second surgical procedure. The processor is configured to determine that each of the control algorithm of the first surgical device and the control algorithm of the second surgical device is an up-to-date control algorithm associated with the first surgical device type. The processor is configured to generate first aggregation data based on at least the first operation data, the second operation data, the first outcome data, and the second outcome data. Based on at least the first aggregation data, the processor is configured to determine a correlation between a first aspect of the up-to-date control algorithm and outcome data. Based on the determined correlation, the processor is configured to generate an updated up-to-date control algorithm.

DETAILED DESCRIPTION

Figure 1:
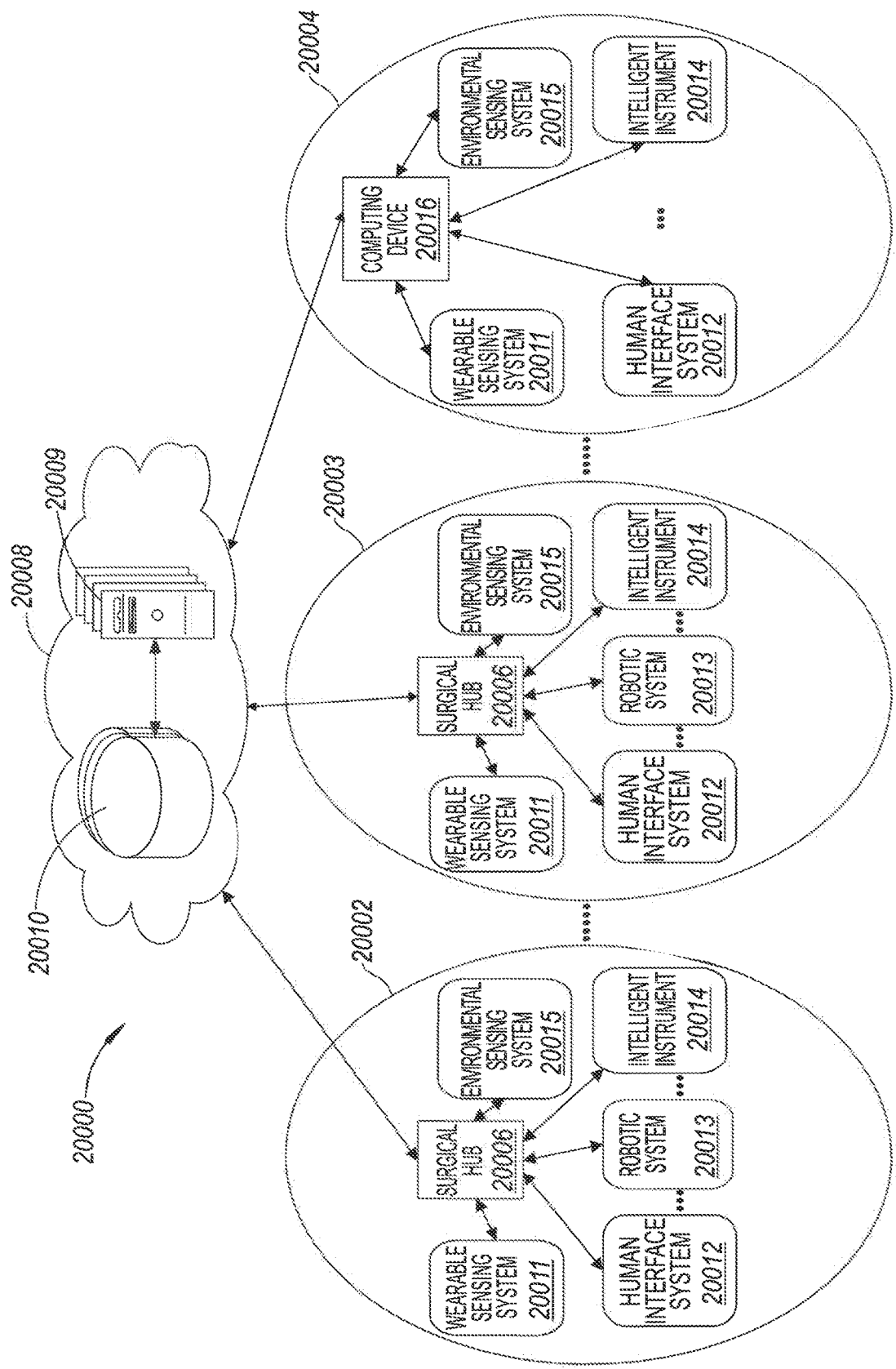
FIG. 1 is a block diagram of a computer-implemented surgical system.

FIG. 1 is a block diagram of a computer-implemented surgical system 20000. An example surgical system such as the surgical system 20000 may include one or more surgical systems (e.g., surgical sub-systems) 20002, 20003 and 20004, For example, surgical system 20002 may include a computer-implemented interactive surgical system. For example, surgical system 20002 may include a surgical hub 20006 and/or a computing device 20016 in communication with a cloud computing system 20008, for example, as described in FIG. 2. The cloud computing system 20008 may include at least one remote cloud server 20009 and at least one remote cloud storage unit 20010. Example surgical systems 20002, 20003, or 20004 may include a wearable sensing system 20011, an environmental sensing system 20015, a robotic system 20013, one or more intelligent instruments 20014, human interface system 20012, etc. The human interface system is also referred herein as the human interface device. The wearable sensing system 20011 may include one or more HCP sensing systems, and/or one or more patient sensing systems. The environmental sensing system 20015 may include one or more devices, for example, used for measuring one or more environmental attributes, for example, as further described in FIG. 2. The robotic system 20013 may include a plurality of devices used for performing a surgical procedure, for example, as farther described in FIG. 2.

The surgical system 20002 may be in communication with a remote server 20009 that may be part of a cloud computing system 20008. In an example, the surgical system 20002 may be in communication with a remote server 20009 via an interact service provider's cable/FIOS networking node. In an example, a patient sensing system may be in direct communication with a remote server 20009. The surgical system 20002 and/or a component therein may communicate with the remote servers 20009 via a cellular transmission/reception point (TRP) or a base station using one or more of the following cellular protocols: GSM/GPRS/EDGE (2G), UMTS/HSPA (3G), long term evolution (LTE) or 4G, LTE-Advanced (LTE-A), new radio (NP) or 5G.

A surgical hub 20006 may have cooperative interactions with one of more means of displaying the image from the laparoscopic scope and information from one or more other smart devices and one or more sensing systems 20011. The surgical hub 20006 may interact with one or more sensing systems 20011, one or more smart devices, and multiple displays. The surgical hub 20006 may be configured to gather measurement data from the one or more sensing systems 20011 and send notifications or control messages to the one or more sensing systems 20011. The surgical hub 20006 may send and/or receive information including notification information to and/or from the human interface system 20012. The human interface system 20012 may include one or more human interface devices (HIDs). The surgical hub 20006 may send and/or receive notification information or control information to audio, display and/or control information to various devices that are in communication with the surgical hub.

For example, the sensing systems 20001 may include the wearable sensing system 20011 (which may include one or more HCP sensing systems and one or more patient sensing systems) and the environmental sensing system 20015 as discussed in FIG. 1. The one or more sensing systems 20001 may measure data relating to various biomarkers. The one or more sensing systems 20001 may measure the biomarkers using one or more sensors, for example, photosensors (e.g., photodiodes, photoresistors), mechanical sensors (e.g., motion sensors), acoustic sensors, electrical sensors, electrochemical sensors, thermoelectric sensors, infrared sensors, etc. The one or more sensors may measure the biomarkers as described herein using one of more of the following sensing technologies: photoplethysmography, electrocardiography, electroencephalography, colorimetry, impedimentary, potentiometry, amperometry, etc.

The biomarkers measured by the one or more sensing systems 20001 may include, but are not limited to, sleep, core body temperature, maximal oxygen consumption, physical activity, alcohol consumption, respiration rate, oxygen saturation, blood pressure, blood sugar, heart rate variability, blood potential of hydrogen, hydration state, heart rate, skin conductance, peripheral temperature, tissue perfusion pressure, coughing and sneezing, gastrointestinal motility, gastrointestinal tract imaging, respiratory tract bacteria, edema, mental aspects, sweat, circulating tumor cells, autonomic tone, circadian rhythm, and/or menstrual cycle.

The biomarkers may relate to physiologic systems, which may include, but are not limited to, behavior and psychology, cardiovascular system, renal system, skin system, nervous system, gastrointestinal system, respiratory system, endocrine system, immune system, tumor, musculoskeletal system, and/or reproductive system. Information from the biomarkers may be determined and/or used by the computer-implemented patient and the surgical system 20000, for example. The information from the biomarkers may be determined and/or used by the computer-implemented patient and the surgical system 20000 to improve said systems and/or to improve patient outcomes, for example. The one or more sensing systems 20001, biomarkers 20005, and physiological systems are described in more detail in U.S. application Ser. No. 17/156,287, titled METHOD OF ADJUSTING A SURGICAL PARAMETER BASED ON BIOMARKER MEASUREMENTS, filed Jan. 22, 2021, the disclosure of which is herein incorporated by reference in its entirety.

Figure 2:
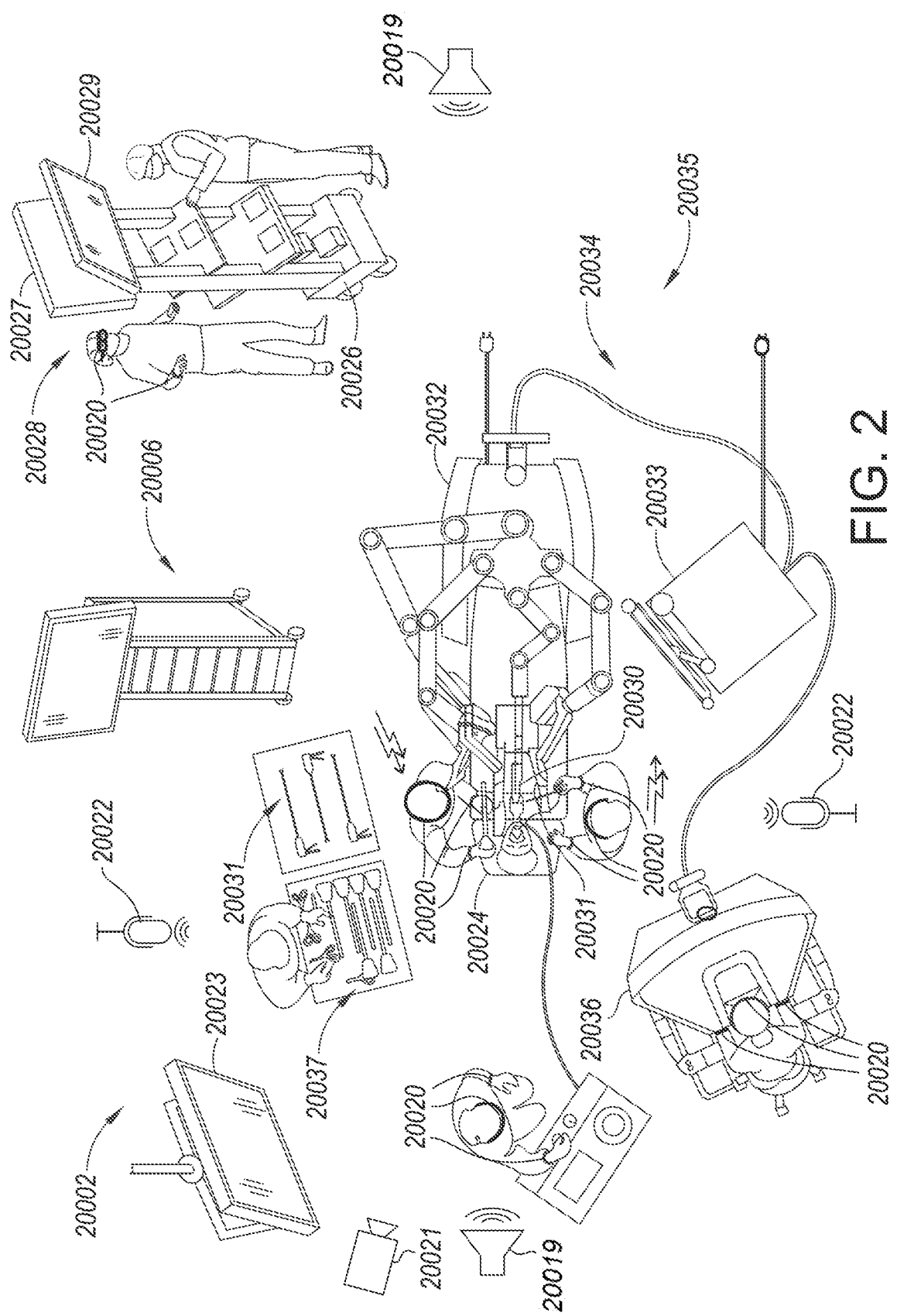
FIG. 2 shows an example surgical system in a surgical operating room.

FIG. 2 shows an example of a surgical system 20002 in a surgical operating room. As illustrated in FIG. 2, a patient is being operated on by one or more health care professionals (HCPs). The HCPs are being monitored by one or more HCP sensing systems 20020 worn by the HCPs. The HCPs and the environment surrounding the HCPs may also be monitored by one or more environmental sensing systems including, for example, a set of cameras 20021, a set of microphones 20022, and other sensors that may be deployed in the operating room. The HCP sensing systems 20020 and the environmental sensing systems may be in communication with a surgical hub 20006, which in turn may be in communication with one or more cloud servers 20009 of the cloud computing system 20008, as shown in FIG. 1. The environmental sensing systems may be used for measuring one or more environmental attributes, for example, HCP position in the surgical theater, HU movements, ambient noise in the surgical theater, temperature/humidity in the surgical theater, etc.

As illustrated in FIG. 2, a primary display 20023 and one or more audio output devices (e.g., speakers 20019) are positioned in the sterile field to be visible to an operator at the operating table 20024. In addition, a visualization/notification tower 20026 is positioned outside the sterile field. The visualization/notification tower 20026 may include a first non-sterile human interactive device (HID) 20027 and a second non-sterile HID 20029, which may face away from each other. The HID may be a display or a display with a touchscreen allowing a human to interface directly with the HID. A human interface system, guided by the surgical hub 20006, may be configured to utilize the HIDs 20027, 20029, and 20023 to coordinate information flow to operators inside and outside the sterile field. In an example, the surgical hub 20006 may cause an HID (e.g., the primary HID 20023) to display a notification and/or information about the patient and/or a surgical procedure step. In an example, the surgical hub 20006 may prompt for and/or receive input from personnel in the sterile field or in the non-sterile area. In an example, the surgical hub 20006 may cause an HID to display a snapshot of a surgical site, as recorded by an imaging device 20030, on a non-sterile HID 20027 or 20029, while maintaining a live feed of the surgical site on the primary HID 20023. The snapshot on the non-sterile display 20027 or 20029 can permit a non-sterile operator to perform a diagnostic step relevant to the surgical procedure, for example.

In one aspect, the surgical hub 20006 may be configured to route a diagnostic input or feedback entered by a non-sterile operator at the visualization tower 20026 to the primary display 20023 within the sterile field, where it can be viewed by a sterile operator at the operating table. In one example, the input can be in the form of a modification to the snapshot displayed on the non-sterile display 20027 or 20029, which can be routed to the primary display 20023 by the surgical hub 20006.

Referring to FIG. 2, a surgical instrument 20031 is being used in the surgical procedure as part of the surgical system 20002. The hub 20006 may be configured to coordinate information flow to a display of the surgical instrument 20031. For example, in U.S. Patent Application Publication No. US 2019-0200844 A1 (U.S. patent application Ser. No. 16/209,385), titled METHOD OF HUB COMMUNICATION, PROCESSING, STORAGE AND DISPLAY, filed Dec. 4, 2018, the disclosure of which is herein incorporated by reference in its entirety. A diagnostic input or feedback entered by a non-sterile operator at the visualization tower 20026 can be routed by the hub 20006 to the surgical instrument display within the sterile field, where it can be viewed by the operator of the surgical instrument 20031. Example surgical instruments that are suitable for use with the surgical system 20002 are described under the heading "Surgical Instrument Hardware" and in U.S. Patent Application Publication No. US 2019-0200844 A1 (U.S. patent application Ser. No. 16/209,385), titled METHOD OF HUB COMMUNICATION, PROCESSING, STORAGE AND DISPLAY, filed Dec. 4, 2018, the disclosure of which is herein incorporated by reference in its entirety, for example.

FIG. 2 illustrates an example of a surgical system 20002 being used to perform a surgical procedure on a patient who is lying down on an operating table 20024 in a surgical operating room 20035. A robotic system 20034 may be used in the surgical procedure as a part of the surgical system 20002. The robotic system 20034 may include a surgeon's console 20036, a patient side cart 20032 (surgical robot), and a surgical robotic hub 20033. The patient side cart 20032 can manipulate at least one removably coupled surgical tool 20037 through a minimally invasive incision in the body of the patient while the surgeon views the surgical site through the surgeon's console 20036. An image of the surgical site can be obtained by a medical imaging device 20030, which can be manipulated by the patient side cart 20032 to orient the imaging device 20030. The robotic hub 20033 can be used to process the images of the surgical site for subsequent display to the surgeon through the surgeon's console 20036.

Other types of robotic systems can be readily adapted for use with the surgical system 20002. Various examples of robotic systems and surgical tools that are suitable for use with the present disclosure are described in U.S. Patent Application Publication No. US 2019-0201137 A1 (U.S. patent application Ser. No. 16/209,407), titled METHOD OF ROBOTIC HUB COMMUNICATION, DETECTION, AND CONTROL, filed Dec. 4, 2018, the disclosure of which is herein incorporated by reference in its entirety.

Various examples of cloud-based analytics that are performed by the cloud computing system 20008, and are suitable for use with the present disclosure, are described U.S. Patent Application Publication No. US 2019-0206569 A1 (U.S. patent application Ser. No. 16/209,403), titled METHOD OF CLOUD BASED DATA ANALYTICS FOR USE WITH THE HUB, filed Dec. 4, 2018, the disclosure of which is herein incorporated by reference in its entirety.

In various aspects, the imaging device 20030 may include at least one image sensor and one or more optical components. Suitable image sensors may include, but are not limited to, Charge-Coupled Device (CCD) sensors and Complementary Metal-Oxide Semiconductor (CMOS) sensors.

The optical components of the imaging device 20030 may include one or more illumination sources and/or one or more lenses. The one or more illumination sources may be directed to illuminate portions of the surgical field. The one or more image sensors may receive light reflected or refracted from the surgical field, including light reflected or refracted from tissue and/or surgical instruments.

The one or more illumination sources may be configured to radiate electromagnetic energy in the visible spectrum as well as the invisible spectrum. The visible spectrum, sometimes referred to as the optical spectrum or luminous spectrum, is the portion of the electromagnetic spectrum that is visible to (i.e., can be detected by) the human eye and may be referred to as visible light or simply light. A typical human eye will respond to wavelengths in air that range from about 380 nm to about 750 nm.

The invisible spectrum (e.g., the non-luminous spectrum) is the portion of the electromagnetic spectrum that lies below and above the visible spectrum (i.e., wavelengths below about 380 nm and above about 750 nm). The invisible spectrum is not detectable by the human eye. Wavelengths greater than about 750 nm are longer than the red visible spectrum, and they become invisible infrared (IR), microwave, and radio electromagnetic radiation. Wavelengths less than about 380 nm are shorter than the violet spectrum, and they become invisible ultraviolet, x-ray, and gamma ray electromagnetic radiation.

In various aspects, the imaging device 20030 is configured for use in a minimally invasive procedure. Examples of imaging devices suitable for use with the present disclosure include, but are not limited to, an arthroscope, angioscope, bronchoscope, choledochoscope, colonoscope, cytoscope, duodenoscope, enteroscope, esophagogastro-duodenoscope (gastroscope), endoscope, laryngoscope, nasopharyngo-neproscope, sigmoidoscope, thoracoscope, and ureteroscope.

The imaging device may employ multi-spectrum monitoring to discriminate topography and underlying structures. A multi-spectral image is one that captures image data within specific wavelength ranges across the electromagnetic spectrum. The wavelengths may be separated by filters or by the use of instruments that are sensitive to particular wavelengths, including light from frequencies beyond the visible light range, e.g., IR and ultraviolet. Spectral imaging can allow extraction of additional information that the human eye fails to capture with its receptors for red, green, and blue. The use of multi-spectral imaging is described in greater detail under the heading "Advanced Imaging Acquisition Module" in U.S. Patent Application Publication No. US 2019-0200844 A1 (U.S. patent application Ser. No. 16/209,385), titled METHOD OF HUB COMMUNICATION, PROCESSING, STORAGE AND DISPLAY, filed Dec. 4, 2018, the disclosure of which is herein incorporated by reference in its entirety. Multi-spectrum monitoring can be a useful tool in relocating a surgical field after a surgical task is completed to perform one or more of the previously described tests on the treated tissue. It is axiomatic that strict sterilization of the operating room and surgical equipment is required during any surgery. The strict hygiene and sterilization conditions required in a "surgical theater," i.e., an operating or treatment room, necessitate the highest possible sterility of all medical devices and equipment. Part of that sterilization process is the need to sterilize anything that comes in contact with the patient or penetrates the sterile field, including the imaging device 20030 and its attachments and components. It will be appreciated that the sterile field may be considered a specified area, such as within a tray or on a sterile towel, that is considered free of microorganisms, or the sterile field may be considered an area, immediately around a patient, who has been prepared for a surgical procedure. The sterile field may include the scrubbed team members, who are properly attired, and all furniture and fixtures in the area.

Wearable sensing system 20011 illustrated in FIG. 1 may include one or more sensing systems, for example, HCP sensing systems 20020 as shown in FIG. 2. The HCP sensing systems 20020 may include sensing systems to monitor and detect a set of physical states and/or a set of physiological states of a healthcare personnel (HCP). An HCP may be a surgeon or one or more healthcare personnel assisting the surgeon or other healthcare service providers in general. In an example, a sensing system 20020 may measure a set of biomarkers to monitor the heart rate of an HCP. In an example, a sensing system 20020 worn on a surgeon's wrist (e.g., a watch or a wristband) may use an accelerometer to detect hand motion and/or shakes and determine the magnitude and frequency of tremors. The sensing system 20020 may send the measurement data associated with tile set of biomarkers and the data associated with a physical state of the surgeon to the surgical hub 20006 for further processing. One or more environmental sensing devices may send environmental information to the surgical hub 20006. For example, the environmental sensing devices may include a camera 20021 for detecting hand/body position of an HCP. The environmental sensing devices may include microphones 20022 for measuring the ambient noise in the surgical theater. Other environmental sensing devices may include devices, for example, a thermometer to measure temperature and a hygrometer to measure humidity of the surroundings in the surgical theater, etc. The surgical hub 20006, alone or in communication with the cloud computing system, may use the surgeon biomarker measurement data and/or environmental sensing information to modify the control algorithms of hand-held instruments or the averaging delay of a robotic interface, for example, to minimize tremors. In an example, the HCP sensing systems 20020 may measure one or more surgeon biomarkers associated with an HCP and send the measurement data associated with the surgeon biomarkers to the surgical hub 20006. The HCP sensing systems 20020 may use one or more of the following RF protocols for communicating with the surgical hub 20006: Bluetooth, Bluetooth Low-Energy (BLE), Bluetooth Smart, Zigbee, Z-wave, IPv6 Low-power wireless Personal Area Network (6LoWPAN), The surgeon biomarkers may include one or more of the following: stress, heart rate, etc. The environmental measurements from the surgical theater may include ambient noise level associated with the surgeon or the patient, surgeon and/or staff movements, surgeon and/or staff attention level, etc.

The surgical hub 20006 may use the surgeon biomarker measurement data associated with an HCP to adaptively control one or more surgical instruments 20031. For example, the surgical hub 20006 may send a control program to a surgical instrument 20031 to control its actuators to limit or compensate for fatigue and use of fine motor skills. The surgical hub 20006 may send the control program based on situational awareness and/or the context on importance or criticality of a task. The control program may instruct the instrument to alter operation to provide more control when control is needed.

Figure 3:
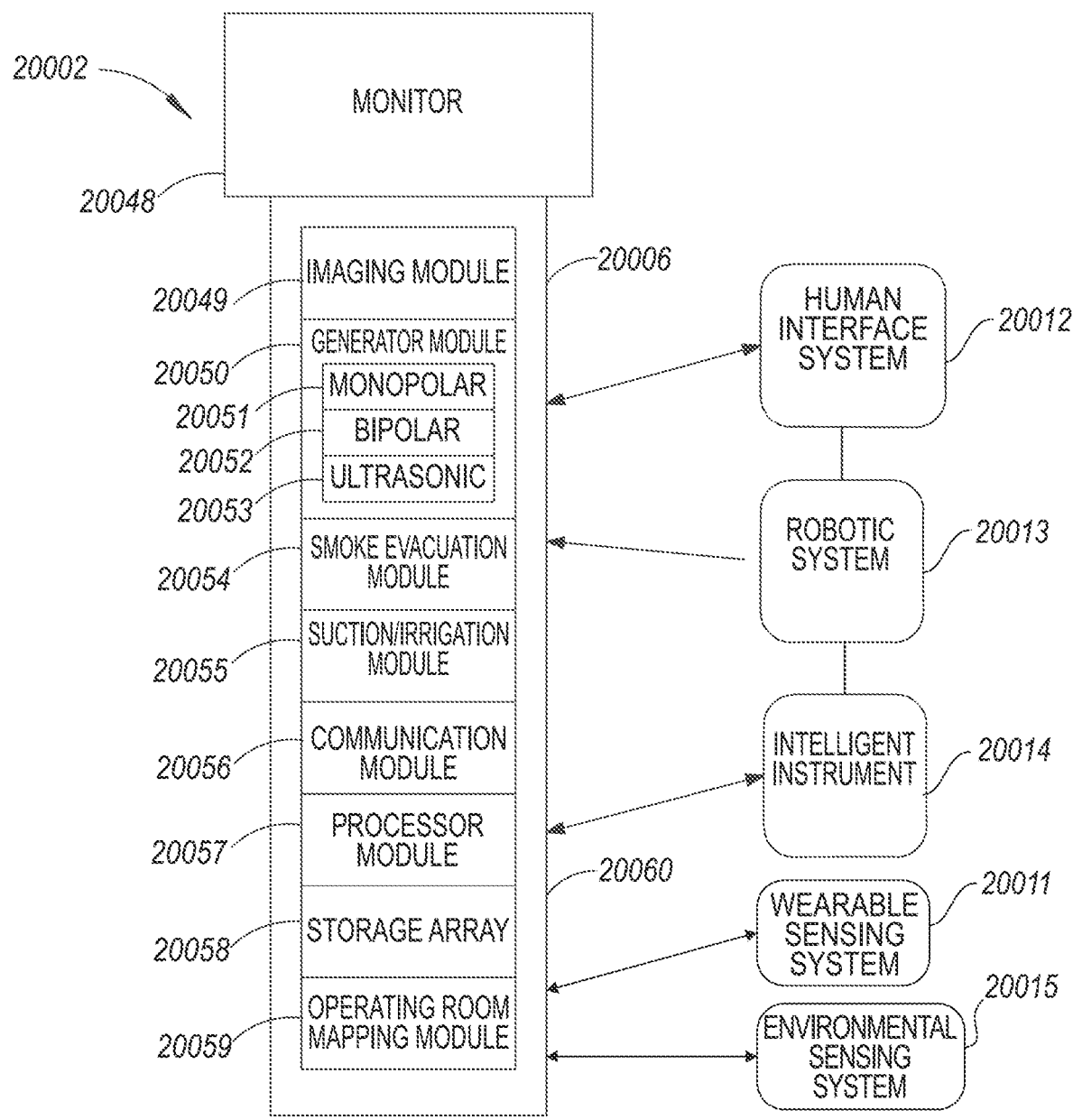
FIG. 3 illustrates an example surgical hub paired with various systems.

FIG. 3 shows an example surgical system 20002 with a surgical hub 20006. The surgical hub 20006 may be paired with, via a modular control, a wearable sensing system 20011, an environmental sensing system 20015, a human interface system 20012, a robotic system 20013, and an intelligent instrument 20014. The hub 20006 includes a display 20048, an imaging module 20049, a generator module 20050, a communication module 20056, a processor module 20057, a storage array 20058, and an operating-room mapping module 20059. In certain aspects, as illustrated in FIG. 3, the hub 20006 further includes a smoke evacuation module 20054 and/or a suction/irrigation module 20055. The various modules and systems may be connected to the modular control either directly via a router or via the communication module 20056. The operating theater devices may be coupled to cloud computing resources and data storage via the modular control. The human interface system 20012 may include a display sub-system and a notification sub-system.

The modular control may be coupled to non-contact sensor module. The non-contact sensor module may measure the dimensions of the operating theater and generate a map of the surgical theater using, ultrasonic, laser-type, and/or the like, non-contact measurement devices. Other distance sensors can be employed to determine the bounds of an operating room. An ultrasound-based non-contact sensor module may scan the operating theater by transmitting a burst of ultrasound and receiving the echo when it bounces off the perimeter walls of an operating theater as described under the heading "Surgical Hub Spatial Awareness Within an Operating Room" in U.S. Provisional Patent Application Ser. No. 62/611,341, titled INTERACTIVE SURGICAL PLATFORM, filed Dec. 28, 2017, which is herein incorporated by reference in its entirety. The sensor module may be configured to determine the size of the operating theater and to adjust Bluetooth-pairing distance limits. A laser-based non-contact sensor module may scan the operating theater by transmitting laser light pulses, receiving laser light pulses that bounce off the perimeter walls of the operating theater, and comparing the phase of the transmitted pulse to the received pulse to determine the size of the operating theater and to adjust Bluetooth pairing distance limits, for example.

During a surgical procedure, energy application to tissue, for sealing and/or cutting, is generally associated with smoke evacuation, suction of excess fluid, and/or irrigation of the tissue. Fluid, power, and/or data lines from different sources are often entangled during the surgical procedure. Valuable time can be lost addressing this issue during a surgical procedure. Detangling the lines may necessitate disconnecting the lines from their respective modules, which may require resetting the modules. The hub modular enclosure 20060 offers a unified environment for managing the power, data, and fluid lines, which reduces the frequency of entanglement between such lines. Aspects of the present disclosure present a surgical hub 20006 for use in a surgical procedure that involves energy application to tissue at a surgical site. The surgical hub 20006 includes a hub enclosure 20060 and a combo generator module slidably receivable in a docking station of the hub enclosure 20060. The docking station includes data and power contacts. The combo generator module includes two or more of an ultrasonic energy generator component, a bipolar RF energy generator component, and a monopolar RF energy generator component that are housed in a single unit. In one aspect, the combo generator module also includes a smoke evacuation component, at least one energy delivery cable for connecting the combo generator module to a surgical instrument, at least one smoke evacuation component configured to evacuate smoke, fluid, and/or particulates generated by the application of therapeutic energy to the tissue, and a fluid line extending from the remote surgical site to the smoke evacuation component. In one aspect, the fluid line may be a first fluid line, and a second fluid line may extend from the remote surgical site to a suction and irrigation module 20055 slidably received in the hub enclosure 20060. In one aspect, the hub enclosure 20060 may include a fluid interface. Certain surgical procedures may require the application of more than one energy type to the tissue. One energy type may be more beneficial for cutting the tissue, while another different energy type may be more beneficial for sealing the tissue. For example, a bipolar generator can be used to seal the tissue while an ultrasonic generator can be used to cut die sealed tissue. Aspects of the present disclosure present a solution where a hub modular enclosure 20060 is configured to accommodate different generators and facilitate an interactive communication therebetween. One of the advantages of the hub modular enclosure 20060 is enabling the quick removal and/or replacement of various modules. Aspects of the present disclosure present a modular surgical enclosure for use in a surgical procedure that involves energy application to tissue. The modular surgical enclosure includes a first energy-generator module, configured to generate a first energy for application to the tissue, and a first docking station comprising a first docking port that includes first data and power contacts, wherein the first energy-generator module is slidably movable into an electrical engagement with the power and data contacts and wherein the first energy-generator module is slidably movable out of the electrical engagement with the first power and data contacts. Further to the above, the modular surgical enclosure also includes a second energy-generator module configured to generate a second energy, different than the first energy, for application to the tissue, and a second docking station comprising a second docking port that includes second data and power contacts, wherein the second energy generator module is slidably movable into an electrical engagement with the power and data contacts, and wherein the second energy-generator module is slidably movable out of the electrical engagement with the second power and data contacts. In addition, the modular surgical enclosure also includes a communication bus between the first docking port and the second docking port, configured to facilitate communication between the first energy-generator module and the second energy-generator module. Referring to FIG. 3, aspects of the present disclosure are presented for a hub modular enclosure 20060 that allows the modular integration of a generator module 20050, a smoke evacuation module 20054, and a suction/irrigation module 20055. The hub modular enclosure 20060 further facilitates interactive communication between the modules 20059, 20054, and 20055. The generator module 20050 can be with integrated monopolar, bipolar, and ultrasonic components supported in a single housing unit slidably insertable into the hub modular enclosure 20060. The generator module 20050 can be configured to connect to a monopolar device 20051, a bipolar device 20052, and an ultrasonic device 20053. Alternatively, the generator module 20050 may comprise a series of monopolar, bipolar, and/or ultrasonic generator modules that interact through the hub modular enclosure 20060. The hub modular enclosure 20060 can be configured to facilitate the insertion of multiple generators and interactive communication between the generators docked into the hub modular enclosure 20060 so that the generators would act as a single generator.

Figure 4:
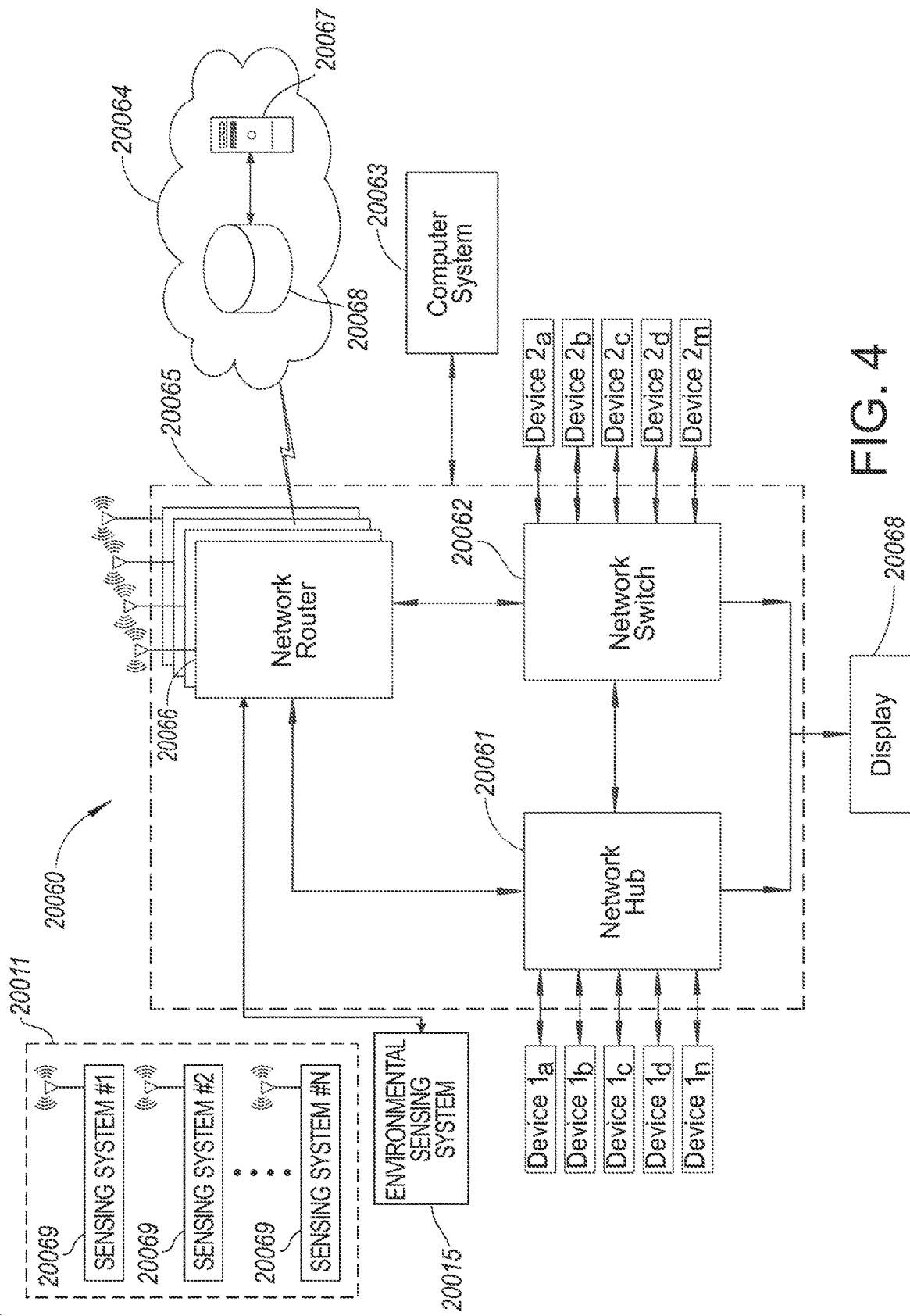
FIG. 4 illustrates a surgical data network having a set of communication surgical hubs configured to connect with a set of sensing systems, an environmental sensing system, a set of devices, etc.

FIG. 4 illustrates a surgical data network having a set of communication hubs configured to connect a set of sensing systems, environment sensing system(s), and a set of other modular devices located in one or more operating theaters of a healthcare facility, a patient recovery room, or a room in a healthcare facility specially equipped for surgical operations, to the cloud, in accordance with at least one aspect of the present disclosure.

As illustrated in FIG. 4, a surgical hub system 20060 may include a modular communication hub 20065 that is configured to connect modular devices located a healthcare facility to a cloud-based system (e.g., a cloud computing system 20064 that may include a remote server 20067 coupled to a remote storage 20068). The modular communication hub 20065 and the devices may be connected in a room in a healthcare facility specially equipped for surgical operations. In one aspect, the modular communication hub 20065 may include a network hub 20061 and/or a network switch 20062 in communication with a network router 20066. The modular communication hub 20065 may be coupled to a local computer system 20063 to provide local computer processing and data manipulation.

The computer system 20063 may comprise a processor and a network interface 20100. The processor may be coupled to a communication module, storage, memory, non-volatile memory, and input/output (I/O) interface via a system bus. The system bus can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), USB, Advanced Graphics Port (AGP), Personal Computer Memory Card International Association bus (PCMCIA), Small Computer Systems Interface (SCSI), or any other proprietary bus.

The processor may be any single-core or multicore processor such as those known under the trade name ARM Cortex by Texas Instruments. In one aspect, the processor may be an LM4F230H5QR ARM Cortex-M4F Processor Core, available from Texas Instruments, for example, comprising an on-chip memory of 256 KB single-cycle flash memory, or other non-volatile memory, up to 40 MHz, a prefetch buffer to improve performance above 40 MHz, a 32 KB single cycle serial random access memory (SRAM), an internal read-only memory (ROM) loaded with StellarisWare® software, a 2 KB electrically erasable programmable read-only memory (EEPROM), and/or one or more pulse width modulation (PWM) modules, one or more quadrature encoder inputs (QEI) analogs, one or more 12-bit analog-to-digital converters (ADCs) with 12 analog input channels, details of which are available for the product datasheet.

In an example, the processor may comprise a safety controller comprising two controller-based families such as TMS570 and RM4x, under the trade name Hercules ARM Cortex R4, also by Texas Instruments. The safety controller may be configured specifically for IEC 61508 and ISO 26262 safety critical applications, among others, to provide advanced integrated safety features while delivering scalable performance, connectivity, and memory options.

It is to be appreciated that the computer system 20063 relay include software that acts as an intermediary between users and the basic computer resources described in a suitable operating environment. Such software may include an operating system. The operating system, which can be stored on the disk storage, may act to control and allocate resources of the computer system. System applications may take advantage of the management of resources by the operating system through program modules and program data stored either in the system memory or on the disk storage. It is to be appreciated that various components described herein can be implemented with various operating systems or combinations of operating systems.

A user may enter commands or information into the computer system 20063 through input device(s) coupled to the I/O interface. The input devices may include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processor 20102 through the system bus via interface port(s). The interface port(s) include, for example, a serial port, a parallel port, a game port, and a USB. The output device(s) use some of the same types of ports as input device(s). Thus, for example, a USB port may be used to provide input to the computer system 20063 and to output information from the computer system 20063 to an output device. An output adapter may be provided to illustrate that there can be some output devices like monitors, displays, speakers, and printers, among other output devices that may require special adapters. The output adapters may include, by way of illustration and not limitation, video and sound cards that provide a means of connection between the output device and the system bus. It should be noted that other devices and/or systems of devices, such as remote computer(s), may provide both input and output capabilities.

The computer system 20063 can operate in a networked environment using logical connections to one or more remote computers, such as cloud computer(s), or local computers. The remote cloud computer(s) can be a personal computer, server, router, network PC, workstation, microprocessor-based appliance, peer device, or other common network node, and the like, and typically includes many or all of the elements described relative to the computer system. For purposes of brevity, only a memory storage device is illustrated with the remote computer(s). The remote computer(s) may be logically connected to the computer system through a network interface and then physically connected via a communication connection. The network interface may encompass communication networks such as local area networks (LANs) and wide area networks (WANs). LAN technologies may include Fiber Distributed Data Interface (FDDI), Copper Distributed Data Interface (CDDI), Ethernet/IEEE 802.3, Token Ring/IEEE 802.5, and the like. WAN technologies may include, but are not limited to, point-to-point circuit-switching; networks like Integrated Services Digital Networks (ISDN) and variations thereon, packet-switching networks, and Digital Subscriber Lines (DSL).

In various examples, the computer system 20063 may comprise an image processor, image-processing engine, media processor, or any specialized digital signal processor (DSP) used for the processing of digital images. The image processor may employ parallel computing with single instruction, multiple data (SIMD) or multiple instruction, multiple data (MIMD) technologies to increase speed and efficiency. The digital image-processing engine can perform a range of tasks. The image processor may be a system on a chip with multicore processor architecture.

The communication connection(s) may refer to the hardware/software employed to connect the network interface to the bus. While the communication connection is shown for illustrative clarity inside the computer system 20063, it can also be external to the computer system 20063. The hardware/software necessary for connection to the network interface may include, for illustrative purposes only, internal and external technologies such as modems, including regular telephone-grade modems, cable modems, optical fiber modems, and DSL modems, ISDN adapters, and Ethernet cards. In some examples, the network interface may also be provided using an RF interface.

Surgical data network associated with the surgical hub system 20060 may be configured as passive, intelligent, or switching. A passive surgical data network serves as a conduit for the data, enabling, it to go from one device (or segment) to another and to the cloud computing resources. An intelligent surgical data network includes additional features to enable the traffic passing through the surgical data network to be monitored and to configure each port in the network hub 20061 or network switch 20062. An intelligent surgical data network may be referred to as a manageable hub or switch. A switching hub reads the destination address of each packet and then forwards the packet to the correct port.

Modular devices 1a-1n located in the operating theater may be coupled to the modular communication hub 20065. The network hub 20061 and/or the network switch 20062 may be coupled to a network router 20066 to connect the devices 1a-1n to the cloud computing system 20064 or the local computer system 20063. Data associated with the devices 1a-1n may be transferred to cloud-based computers via the router for remote data processing and manipulation. Data associated with the devices 1a-1n may also be transferred to the local computer system 20063 for local data processing and manipulation. Modular devices 2a-2m located in the same operating theater also may be coupled to a network switch 20062. The network switch 20062 may be coupled to the network hub 20061 and/or the network router 20066 to connect the devices 2a-2m to the cloud 20064. Data associated with the devices 2a-2m may be transferred to the cloud computing system 20064 via the network router 20066 for data processing and manipulation. Data associated with the devices 2a-2m may also be transferred to the local computer system 20063 for local data processing and manipulation.

The wearable sensing system 20011 may include one or more sensing systems 20069. The sensing systems 20069 may include an HCP sensing system and/or a patient sensing system. The one or more sensing systems 20069 may be in communication with the computer system 20063 of a surgical hub system 20060 or the cloud server 20067 directly via one of the network routers 20066 or via a network hub 20061 or network switching 20062 that is in communication with the network routers 20066.

The sensing systems 20069 may be coupled to the network router 20066 to connect to the sensing systems 20069 to the local computer system 20063 and/or the cloud computing system 20064. Data associated with the sensing systems 20069 may be transferred to the cloud computing system 20064 via the network router 20066 for data processing and manipulation. Data associated with the sensing systems 20069 may also be transferred to the local computer system 20063 for local data processing and manipulation.

As illustrated in FIG. 4, the surgical hub system 20060 may be expanded by interconnecting multiple network hubs 20061 and/or multiple network switches 20062 with multiple network routers 20066. The modular communication hub 20065 may be contained in a modular control tower configured to receive multiple devices 1a-1n/2a-2m. The local computer system 20063 also may be contained in a modular control tower. The modular communication hub 20065 may be connected to a display 20068 to display images obtained by some of the devices 1a-1n/2a-2m, for example during surgical procedures. In various aspects, the devices 1a-1n/2a-2m may include, for example, various modules such as an imaging module coupled to an endoscope, a generator module coupled to an energy-based surgical device, a smoke evacuation module, a suction/irrigation module, a communication module, a processor module, a storage array, a surgical device coupled to a display, and/or a non-contact sensor module, among other modular devices that may be connected to the modular communication hub 20065 of the surgical data network.

In one aspect, the surgical hub system 20060 illustrated in FIG. 4 may comprise a combination of network hub(s), network switch(es), and network router(s) connecting the devices 1a-1n/2a-2m or the sensing systems 20069 to the cloud-base system 20064. One or more of the devices 1a-1n/2a-2m or the sensing systems 20069 coupled to the network hub 20061 or network switch 20062 may collect data in real-time and transfer the data to cloud computers for data processing and manipulation. It will be appreciated that cloud computing relies on sharing computing resources rather than having local servers or personal devices to handle software applications. The word "cloud" may be used as a metaphor for "the Internet," although the term is not limited as such. Accordingly, the term "cloud computing" may be used herein to refer to "a type of Internet-based computing," where different services—such as servers, storage, and applications—are delivered to the modular communication hub 20065 and/or computer system 20063 located in the surgical theater (e.g., a fixed, mobile, temporary, or field operating room or space) and to devices connected to the modular communication hub 20065 and/or computer system 20063 through the Internet. The cloud infrastructure may be maintained by a cloud service provider. In this context, the cloud service provider may be the entity that coordinates the usage and control of the devices 1a-1n/2a-2m located in one or more operating theaters. The cloud computing services can perform a large number of calculations based on the data gathered by smart surgical instruments, robots, sensing systems, and other computerized devices located in the operating theater. The hub hardware enables multiple devices, sensing systems, and/or connections to be connected to a computer that communicates with the cloud computing resources and storage.

Applying cloud computer data processing techniques on the data collected by the devices 1a-1n/2a-2m the surgical data network can provide improved surgical outcomes, reduced costs, and improved patient satisfaction. At least some of the devices 1a-1n/2a-2m may be employed to view tissue states to assess leaks or perfusion of sealed tissue after a tissue sealing and cutting procedure. At least some of the devices 1a-1n/2a-2m may be employed to identify pathology, such as the effects of diseases, using the cloud-based computing to examine data including images of samples of body tissue for diagnostic purposes. This may include localization and margin confirmation of tissue and phenotypes. At least some of the devices 1a-1n/2a-2m may be employed to identify anatomical structures of the body using a variety of sensors integrated with imaging devices and techniques such as overlaying images captured by multiple imaging devices. The data gathered by the devices 1a-1n/2a-2m including image data, may be transferred to the cloud computing system 20064 or the local computer system 20063 or both for data processing and manipulation including image processing and manipulation. The data may be analyzed to improve surgical procedure outcomes by determining if further treatment, such as the application of endoscopic intervention, emerging technologies, a targeted radiation, targeted intervention, and precise robotics to tissue-specific sites and conditions, may be pursued. Such data analysis may further employ outcome analytics processing and using standardized approaches may provide beneficial feedback to either confirm surgical treatments and the behavior of the surgeon or suggest modifications to surgical treatments and the behavior of the surgeon.

Applying cloud computer data processing techniques on the measurement data collected by the sensing systems 20069, the surgical data network can provide improved surgical outcomes, improved recovery outcomes, reduced costs, and improved patient satisfaction. At least some of the sensing systems 20069 may be employed to assess physiological conditions of a surgeon operating on a patient or a patient being prepared for a surgical procedure or a patient recovering after a surgical procedure. The cloud-based computing system 20064 may be used to monitor biomarkers associated with a surgeon or a patient in real-time and to generate surgical plans based at least on measurement data gathered prior to a surgical procedure, provide control signals to the surgical instruments during a surgical procedure, and notify a patient of a complication during post-surgical period.

The operating theater devices may be connected to the modular communication hub 20065 over a wired channel or a wireless channel depending on the configuration of the devices 1a-1n to a network hub 20061. The network hub 20061 may be implemented, in one aspect, as a local network broadcast device that works on the physical layer of the Open System Interconnection (OSI) model. The network hub may provide connectivity to the devices 1a-1n located in the same operating theater network. The network hub 20061 may collect data in the form of packets and sends them to the router in half duplex mode. The network hub 20061 may not store any media access control/Internet Protocol (MAC/IP) to transfer the device data. Only one of the devices 1a-1n can send data at a time through the network hub 20061. The network hub 20061 may not have routing tables or intelligence regarding where to send information and broadcasts all network data across each connection and to a remote server 20067 of the cloud computing system 20064. The network hub 20061 can detect basic network errors such as collisions but having all information broadcast to multiple ports can be a security risk and cause bottlenecks.

The operating theater devices 2a-2m may be connected to a network switch 20062 over a wired channel or a wireless channel. The network switch 20062 works in the data link layer of the OSI model. The network switch 20062 may be a multicast device for connecting the devices 2a-2m located in the same operating theater to the network. The network switch 20062 may send data in the form of frames to the network router 20066 and may work in full duplex mode. Multiple devices 2a-2m can send data at the same time through the network switch 20062. The network switch 20062 stores and uses MAC addresses of the devices 2a-2m to transfer data.

The network hub 20061 and/or the network switch 20062 may be coupled to the network router 20066 for connection to the cloud computing system 20064. The network router 20066 works in the network layer of the OSI model. The network router 20066 creates a route for transmitting data packets received from the network hub 20061 and/or network switch 20062 to cloud-based computer resources for further processing and manipulation of the data collected by any one of or all the devices 1a-1n/2a-2m and wearable sensing system 20011. The network router 20066 may be employed to connect two or more different networks located in different locations, such as, for example, different operating theaters of the same healthcare facility or different networks located in different operating, theaters of different healthcare facilities. The network router 20066 may send data in the form of packets to the cloud computing system 20064 and works in full duplex mode. Multiple devices can send data at the same time. The network router 20066 may use IP addresses to transfer data.

In an example, the network hub 20061 may be implemented as a USB hub, which allows multiple USB devices to be connected to a host computer. The USB hub may expand a single USB port into several tiers so that there are more ports available to connect devices to the host system computer. The network hub 20061 may include wired or wireless capabilities to receive information over a wired channel or a wireless channel. In one aspect, a wireless USB short-range, high-bandwidth wireless radio communication protocol may be employed for communication between the devices 1a-1n and devices 2a-2m located in the operating theater.

In examples, the operating theater devices 1a-1n/2a-2m and/or the sensing systems 20069 may communicate to the modular communication hub 20065 via Bluetooth wireless technology standard for exchanging data over short distances (using short-wavelength UHF radio waves in the ISM band front 2.4 to 2.485 GHz) from fixed and mobile devices and building personal area networks (PANs). The operating theater devices 1a-1n/2a-2m and/or the sensing systems 20069 may communicate to the modular communication hub 20065 via a number of wireless or wired communication standards or protocols, including but not limited to Bluetooth, Low Energy Bluetooth, near-field communication (NFC), Wi-Fi (IEEE 802.11 family), WiMAX (IEEE 802.16 family), IEEE 802.20, new radio (NR), long-term evolution (LTE), and Ev-DO, HSPA+, HSDPA+, HSUPA+, EDGE, GSM, GPRS, CDMA, DECT, and Ethernet derivatives thereof, as well as any other wireless and wired protocols that are designated as 3G, 4G, 5G, and beyond. The computing module may include a plurality of communication modules. For instance, a first communication module may be dedicated to shorter-range wireless communications such as Wi-Fi and Bluetooth Low-Energy Bluetooth, Bluetooth Smart, and a second communication module may be dedicated to longer-range wireless communications such as GPS, EDGE, GPRS, CDMA, WiMAX, LTE, Ev-DO, HSPA+, HSDPA+, HSUPA+, EDGE, GSM, GPRS, CDMA, TDMA, and others.

The modular communication hub 20065 may serve as a central connection for one or more of the operating theater devices 1a-1n/2a-2m and/or the sensing systems 20069 and may handle a data type known as frames. Frames may carry the data generated by the devices 1a-1n/2a-2m and/or the sensing systems 20069. When a frame is received by the modular communication hub 20065, it may be amplified and/or sent to the network router 20066, which may transfer the data to the cloud computing system 20064 or the local computer system 20063 by using a number of wireless or wired communication standards or protocols, as described herein.

The modular communication hub 20065 can be used as a standalone device or be connected to compatible network hubs 20061 and network switches 20062 to form a larger network. The modular communication hub 20065 can be generally easy to install, configure, and maintain, making it a good option for networking the operating theater devices 1a-1n/2a-2m.

Figure 5:
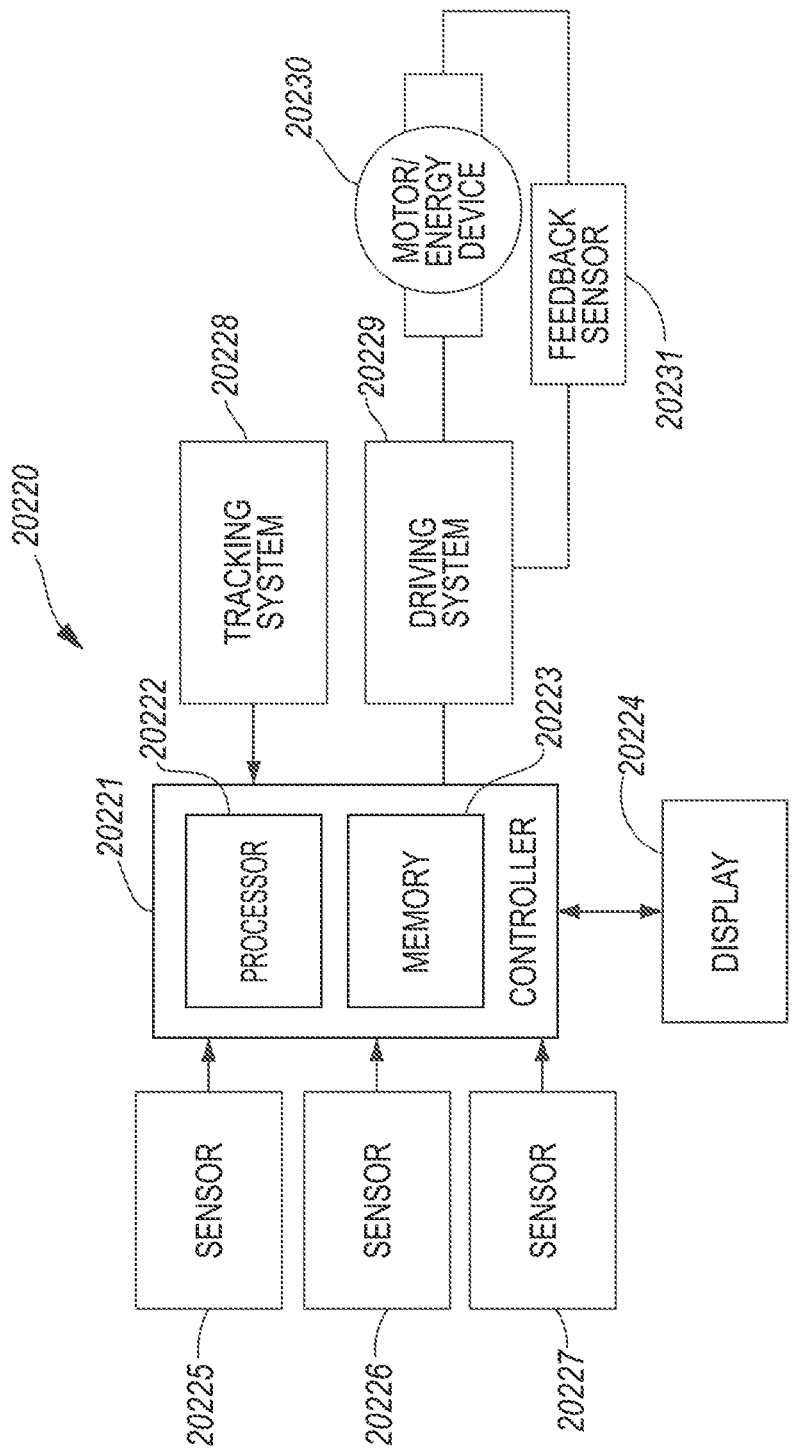
FIG. 5 illustrates a logic diagram of a control system of a surgical instrument.

FIG. 5 illustrates a logical diagram of a control system 20220 of a surgical instrument or a surgical tool in accordance with one or more aspects of the present disclosure. The surgical instrument or the surgical tool may be configurable. The surgical instrument may include surgical fixtures specific to the procedure at-hand, such as imaging devices, surgical staplers, energy devices, endocutter devices, or the like. For example, the surgical instrument may include any of a powered stapler, a powered stapler generator, an energy device, an advanced energy device, an advanced energy jaw device, an endocutter daffy, an energy device generator, an in-operating-room imaging system, a smoke evacuator, a suction-irrigation device, an insufflation system, or the like. The system 20220 may comprise a control circuit. The control circuit may include a microcontroller 20221 comprising a processor 20222 and a memory 20223. One or more of sensors 20225, 20226, 20227, for example, provide real-time feedback to the processor 20222. A motor 20230, driven by a motor driver 20229, operably couples a longitudinally movable displacement member to drive the I-beam knife element. A tracking system 20228 may be configured to determine the position of the longitudinally movable displacement member. The position information may be provided to the processor 20222, which can be programmed or configured to determine the position of the longitudinally movable drive member as well as the position of a firing member, firing bar, and I-beam knife element. Additional motors may be provided at the tool driver interface to control I-beam firing, closure tube travel, shaft rotation, and articulation. A display 20224 may display a variety of operating conditions of the instruments and may include touch screen functionality for data input. Information displayed on the display 20224 may be overlaid with images acquired via endoscopic imaging modules.

The microcontroller 20221 may be any single-core or multicore processor such as those known under the trade name ARM Cortex by Texas Instruments. In one aspect, the main microcontroller 20221 may be an LM4P230H5QR ARM Cortex-M4F Processor Core, available from Texas instruments, for example, comprising an on-chip memory of 256 KB single-cycle flash memory, of other non-volatile memory, up to 40 MHz, a prefetch buffer to improve performance above 40 MHz, a 32 KB single-cycle SRAM, and internal ROM loaded with StellarisWare® software, a 2 KB EEPROM, one or more PWM modules, one or more QEI analogs, and one or more 12-bit ADCs with 12 analog input channels, details of which are available for the product datasheet.

The microcontroller 20221 may comprise a safety controller comprising two controller-based families such as TMS570 and RM4x, known under the trade name Hercules ARM Cortex R4, also by Texas Instruments. The safety controller may be configured specifically for IEC 61508 and ISO 26262 safety critical applications, among others, to provide advanced integrated safety features while delivering scalable performance, connectivity, and memory options.

The microcontroller 20221 may be programmed to perform various functions such as precise control over the speed and position of the knife and articulation systems. In one aspect, the microcontroller 20221 may include a processor 20222 and a memory 20223. The electric motor 20230 may be a brushed direct current (DC) motor with a gearbox and mechanical links to an articulation or knife system. In one aspect, a motor driver 20229 may be an A3941 available from Allegro Microsystems, Inc. Other motor drivers may be readily substituted for use in the tracking system 20228 comprising an absolute positioning system. A detailed description of an absolute positioning system is described in U.S. Patent Application Publication No. 2017/0296213, titled SYSTEMS AND METHODS FOR CONTROLLING A SURGICAL STAPLING AND CUTTING INSTRUMENT, which published on Oct. 19, 2017, which is herein incorporated by reference in its entirety.

The microcontroller 20221 may be programmed to provide precise control over the speed and position of displacement members and articulation systems. The microcontroller 20221 may be configured to compute a response in the software of the microcontroller 20221. The computed response may be compared to a measured response of the actual system to obtain an "observed" response, which is used for actual feedback decisions. The observed response may be a favorable, tuned value that balances the smooth, continuous nature of the simulated response with the measured response, which can detect outside influences on the system.

The motor 20230 may be controlled by the motor driver 20229 and can be employed by the firing system of the surgical instrument or tool in various forms, the motor 20230 may be a brushed DC driving motor having a maximum rotational speed of approximately 25,000 RPM. In some examples, the motor 20230 may include a brushless motor, a cordless motor, a synchronous motor, a stepper motor, or any other suitable electric motor. The motor driver 20229 may comprise an H-bridge driver comprising field-effect transistors (FETs), for example. The motor 20230 can be powered by a power assembly releasably mounted to the handle assembly or tool housing for supplying control power to the surgical instrument or tool. The power assembly may comprise a battery which may include a number of battery cells connected in series that can be used as the power source to power the surgical instrument or tool. In certain circumstances, the battery cells of the power assembly may be replaceable and/or rechargeable. In at least one example, the battery cells can be lithium-ion batteries which can be couplable to and separable from the power assembly.

The motor driver 20229 may be an A3941 available from Allegro Microsystems, Inc. A3941 may be a hill-bridge controller for use with external N-channel power metal-oxide semiconductor field-effect transistors (MOSFETs) specifically designed for inductive loads, such as brush DC motors. The driver 20229 may comprise a unique charge pump regulator that can provide full (>10 V) gate drive for battery voltages down to 7 V and can allow the A3941 to operate with a reduced gate drive, down to 5.5 V. A bootstrap capacitor may be employed to provide the above battery supply voltage required for N-channel MOSFETs. An internal charge pump for the high-side drive may allow DC (100% duty cycle) operation. The Stall bridge can be driven in fast or slow decay modes using diode or synchronous rectification. In the slow decay mode, current recirculation can be through the high-side or the low-side FETS. The power FETS may be protected from shoot-through by resistor-adjustable dead time. Integrated diagnostics provide indications of undervoltage, overtemperature, and power bridge faults and can be configured to protect the power MOSFETs under most short circuit conditions. Other motor drivers may be readily substituted for use in the tracking system 20228 comprising an absolute positioning system.

The tracking system 20228 may comprise a controlled motor drive circuit arrangement comprising a position sensor 20225 according to one aspect of this disclosure. The position sensor 20225 for an absolute positioning system may provide a unique position signal corresponding to the location of a displacement member. In some examples, the displacement member may represent a longitudinally movable drive member comprising a rack of drive teeth for meshing engagement with a corresponding drive gear of a gear reducer assembly. In some examples, the displacement member may represent the firing member, which could be adapted and configured to include a rack of drive teeth. In some examples, the displacement member may represent a firing bar or the I-beam, each of which can be adapted and configured to include a rack of drive teeth. Accordingly, as used herein, the term displacement member can be used generically to refer to any movable member of the surgical instrument or tool such as the drive member, the firing member, the firing bar, the I-beam, or any element that can be displaced. In one aspect, the longitudinally movable drive member can be coupled to the firing member, the firing bar, and the I-beam. Accordingly, the absolute positioning system can, in effect, track the linear displacement of the I-beam by tracking the linear displacement of the longitudinally movable drive member. In various aspects, the displacement member may be coupled to any position sensor 20225 suitable for measuring linear displacement. Thus, the longitudinally movable drive member, the firing member, the firing bar, or the I-beam, or combinations thereof, may be coupled to any suitable linear displacement sensor. Linear displacement sensors may include contact or non-contact displacement sensors. Linear displacement sensors may comprise linear variable differential transformers (LVDT), differential variable reluctance transducers (DVRT), a slide potentiometer, a magnetic sensing system comprising a movable magnet and a series of linearly arranged Hall effect sensors, a magnetic sensing system comprising a fixed magnet and a series of movable, linearly arranged Hall effect sensors, an optical sensing system comprising a movable light source and a series of linearly arranged photo diodes or photo detectors, an optical sensing system comprising a fixed light source and a series of movable linearly, arranged photodiodes or photodetectors, or any combination thereof.

The electric motor 20230 can include a rotatable shaft that operably interfaces with a gear assembly that is mounted in meshing engagement with a set, or rack, of drive teeth on the displacement member. A sensor element may be operably coupled to a gear assembly such that a single revolution of the position sensor 20225 element corresponds to some linear longitudinal translation of the displacement member. An arrangement of gearing and sensors can be connected to the linear actuator, via a rack and pinion arrangement, or a rotary actuator, via a spur gear or other connection. A power source may supply power to the absolute positioning system and an output indicator may display the output of the absolute positioning system. The displacement member may represent the longitudinally movable drive member comprising a rack of drive teeth formed thereon for meshing engagement with a corresponding drive gear of the gear reducer assembly. The displacement member may represent the longitudinally movable firing member, firing bar, I-beam, or combinations thereof.

A single revolution of the sensor element associated with the position sensor 20225 may be equivalent to a longitudinal linear displacement d1 of the displacement member, where d1 is the longitudinal linear distance that the displacement member moves from point "a" to point "b" after a single revolution of the sensor element coupled to the displacement member. The sensor arrangement may be connected via a gear reduction that results in the position sensor 20225 completing one or more revolutions for the full stroke of the displacement member. The position sensor 20225 may complete multiple revolutions for the full stroke of the displacement member.

A series of switches, where n is an integer greater than one, may be employed alone or in combination with a gear reduction to provide a unique position signal for more than one revolution of the position sensor 20225. The state of the switches may be fed back to the microcontroller 20221 that applies logic to determine a unique position signal corresponding to the longitudinal linear displacement d1+d2+ . . . dn of the displacement member. The output of the position sensor 20225 is provided to the microcontroller 20221. The position sensor 20225 of the sensor arrangement may comprise a magnetic sensor, an analog rotary sensor like a potentiometer, or an array of analog Hall-effect elements, which output a unique combination of position signals or values.

The position sensor 20225 may comprise any number of magnetic sensing elements, such as, for example, magnetic sensors classified according to whether they measure the total magnetic field or the vector components of the magnetic field. The techniques used to produce both types of magnetic sensors may encompass many aspects of physics and electronics. The technologies used for magnetic field sensing may include search coil, fluxgate, optically pumped, nuclear precession, SQUID, Hall-effect, anisotropic magnetoresistance, giant magnetoresistance, magnetic tunnel junctions, giant magnetoimpedance, magnetostrictive/piezoelectric composites, magnetodiode, magnetotransistor, fiber-optic, magneto-optic, and microelectromechanical systems-based magnetic sensors, among others.

The position sensor 20225 for the tracking system 20228 comprising an absolute positioning system may comprise a magnetic rotary absolute positioning system. The position sensor 20225 may be implemented as an AS5055EQFT single-chip magnetic rotary position sensor available from Austria Microsystems, AG. The position sensor 20225 is interfaced with the microcontroller 20221 to provide an absolute positioning system. The position sensor 20225 may be a low-voltage and low-power component and may include four Hall-effect elements in an area of the position sensor 20225 that may be located above a magnet. A high-resolution ADC and a smart power management controller may also be provided on the chip. A coordinate rotation digital computer (CORDIC) processor, also known as the digit-by-digit method and Volder's algorithm, may be provided to implement a simple and efficient algorithm to calculate hyperbolic and trigonometric functions that require only addition, subtraction, bit-shift, and table lookup operations. The angle position, alarm bits, and magnetic field information may be transmitted over a standard serial communication interface, such as a serial peripheral interface (SPI) interface, to the microcontroller 20221. The position sensor 20225 may provide 12 or 14 bits of resolution. The position sensor 20225 may be an AS5055 chip provided in a small QFN 16-pin 4×4×0.85 mm package.

The tracking system 20228 comprising an absolute positioning system may comprise and/or be programmed to implement a feedback controller, such as a PID, state feedback, and adaptive controller. A power source converts the signal from the feedback controller into a physical input to the system: in this case the voltage. Other examples include a PWM of the voltage, current, and force. Other sensor(s) may be provided to measure physical parameters of the physical system in addition to the position measured by the position sensor 20225. In some aspects, the other sensor(s) can include sensor arrangements such as those described in U.S. Pat. No. 9,345,481, titled STAPLE CARTRIDGE TISSUE THICKNESS SENSOR SYSTEM, which issued on May 24, 2016, which is herein incorporated by reference in its entirety; U.S. Patent Application Publication No. 2014/0263552, titled STAPLE CARTRIDGE TISSUE THICKNESS SENSOR SYSTEM, which published on Sep. 18, 2014, which is herein incorporated by reference in its entirety; and U.S. patent application Ser. No. 15/628,175, titled TECHNIQUES FOR ADAPTIVE CONTROL OF MOTOR VELOCITY OF A SURGICAL STAPLING AND CUTTING INSTRUMENT, filed Jun. 20, 2017, which is herein incorporated by reference in its entirety. In a digital signal processing system, an absolute positioning system is coupled to a digital data acquisition system where the output of the absolute positioning system will have a finite resolution and sampling frequency. The absolute positioning system may comprise a compare-and-combine circuit to combine a computed response with a measured response using algorithms, such as a weighted average and a theoretical control loop, that drive the computed response towards the measured response. The computed response of the physical system may take into account properties like mass, inertia, viscous friction, inductance resistance, etc., to predict what the states and outputs of the physical system will be by knowing the input.

The absolute positioning system may provide an absolute position of the displacement member upon power-up of the instrument, without retracting or advancing the displacement member to a reset (zero or home) position as may be required with conventional rotary encoders that merely count the number of steps forwards or backwards that the motor 20230 has taken to infer the position of a device actuator, drive bar, knife, or the like.

A sensor 20226, such as, for example, a strain gauge or a micro-strain gauge, may be configured to measure one or more parameters of the end effector, such as, for example, the amplitude of the strain exerted on the anvil during a clamping operation, which can be indicative of the closure forces applied to the anvil. The measured strain may be converted to a digital signal and provided to the processor 20222. Alternatively, or in addition to the sensor 20226, a sensor 20227, such as, for example, a load sensor, can measure the closure force applied by the closure drive system to the anvil. The sensor 20227, such as, for example, a load sensor, can measure the firing force applied to an I-beam in a firing stroke of the surgical instrument or tool. The I-beam is configured to engage a wedge sled, which is configured to upwardly cam staple drivers to force out staples into deforming contact with an anvil. The I-beam also may include a sharpened cutting edge that can be used to sever tissue as the I-beam is advanced distally by the firing bar. Alternatively, a current sensor 20231 can be employed to measure the current drawn by the motor 20230. The force required to advance the firing member can correspond to the current drawn by the motor 20230, for example. The measured force may be converted to a digital signal and provided to the processor 20222.

For example, the strain gauge sensor 20226 can be used to measure the force applied to the tissue by the end effector. A strain gauge can be coupled to the end effector to measure the force on the tissue being treated by the end effector. A system for measuring forces applied to the tissue grasped by the end effector may comprise a strain gauge sensor 20226, such as, for example, a micro-strain gauge, that can be configured to measure one or more parameters of the end effector, for example. In one aspect, the strain gauge sensor 20226 can measure the amplitude or magnitude of the strain exerted on a jaw member of an end effector during a clamping operation, which can be indicative of the tissue compression. The measured strain can be converted to a digital signal and provided to a processor 20222 of the microcontroller 20221. A load sensor 20227 can measure the force used to operate the knife element, for example, to cut the tissue captured between the anvil and the staple cartridge. A magnetic field sensor can be employed to measure the thickness of the captured tissue. The measurement of the magnetic field sensor also may be converted to a digital signal and provided to the processor 20222.

The measurements of the tissue compression, the tissue thickness, and/or the force required to close the end effector on the tissue, as respectively measured by the sensors 20226, 20227, can be used by the microcontroller 20221 to characterize the selected position of the firing member and the corresponding value of the speed of the firing member. In one instance, a memory 20223 may store a technique, an equation, and/or a lookup table which can be employed by the microcontroller 20221 in the assessment.

The control system 20220 of the surgical instrument or tool also may comprise wired or wireless communication circuits to communicate with the surgical hub 20065 as shown in FIG. 4.

Figure 6:
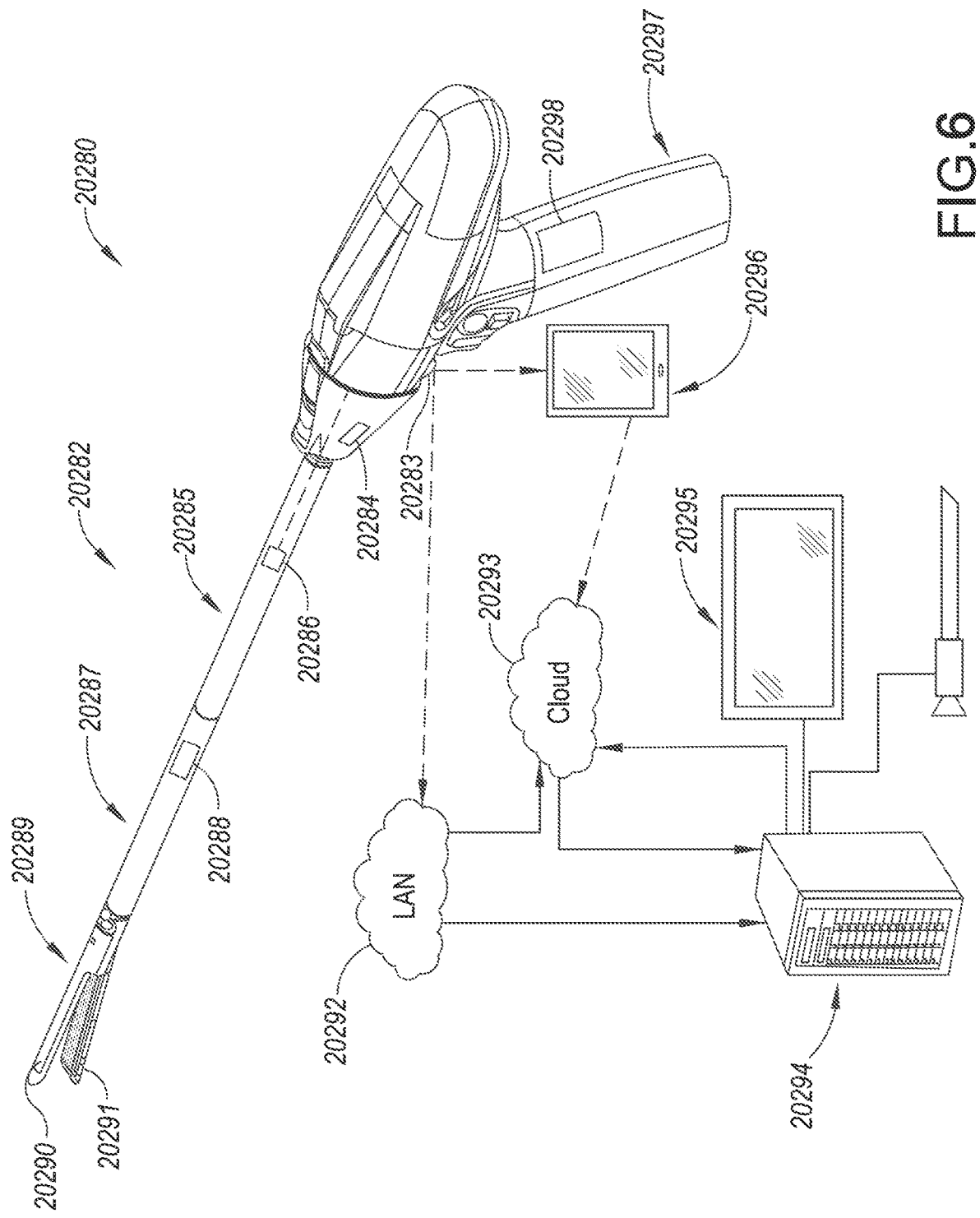
FIG. 6 shows an example surgical system that includes a handle having a controller and a motor, an adapter releasably coupled to the handle, and a loading unit releasably coupled to the adapter.

FIG. 6 illustrates an example surgical system 20280 in accordance with the present disclosure and may include a surgical instrument 20282 that can be in communication with a console 20294 or a portable device 20296 through a local area network 20292 and/or a cloud network 20293 via a wired and/or wireless connection. The console 20294 and the portable device 20296 may be any suitable computing device. The surgical instrument 20282 may include a handle 20297, an adapter 20285, and a loading unit 20287. The adapter 20285 releasably couples to the handle 20297 and the loading unit 20287 releasably couples to the adapter 20285 such that the adapter 20285 transmits a force front a drive shaft to the loading unit 20287. The adapter 20285 or the loading unit 20287 may include a force gauge (not explicitly shown) disposed therein to measure a force exerted on the loading unit 20287. The loading unit 20287 may include an end effector 20289 having a first jaw 20291 and a second jaw 20290. The loading unit 20287 may be an in-situ loaded or multi-firing loading unit (WILD) that allows a clinician to fire a plurality of fasteners multiple times without requiring the loading unit 20287 to be removed from a surgical site to reload the loading unit 20287.

The first and second jaws 20291, 20290 may be configured to clamp tissue therebetween, fire fasteners through the clamped tissue, and sever the clamped tissue. The first jaw 20291 may be configured to fire at least one fastener a plurality of times or may be configured to include a replaceable multi-fire fastener cartridge including a plurality of fasteners (e.g., staples, clips, etc.) that may be fired more than one time prior to being replaced. The second jaw 20290 may include an anvil that deforms or otherwise secures the fasteners, as the fasteners are ejected from the multi-fire fastener cartridge.

The handle 20297 may include a motor that is coupled to the drive shaft to affect rotation of the drive shaft. The handle 20297 may include a control interface to selectively activate the motor. The control interface may include buttons, switches, levers, sliders, touchscreens, and any other suitable input mechanisms or user interfaces, which can be engaged by a clinician to activate the motor.

The control interface of the handle 20297 may be in communication with a controller 20298 of the handle 20297 to selectively activate the motor to affect rotation of the drive shafts. The controller 20298 may be disposed within the handle 20297 and may be configured to receive input from the control interface, and adapter data from the adapter 20285 or loading unit data from the loading unit 20287. The controller 20298 may analyze the input from the control interface and the data received from the adapter 20285 and/or loading unit 20287 to selectively activate the motor.

The handle 20297 may also include a display that is viewable by a clinician during use of the handle 20297. The display may be configured to display portions of the adapter or loading unit data before, during, or after firing of the instrument 20282.

The adapter 20285 may include an adapter identification device 20281 disposed therein and the loading unit 20287 may include a loading unit identification device 20288 disposed therein. The adapter identification device 20284 may be in communication with the controller 20298, and the loading unit identification device 20288 may be in communication with the controller 20298. It will be appreciated that the loading unit identification device 20288 may be in communication with the adapter identification device 20284, which relays or passes communication from the loading unit identification device 20288 to the controller 20298.

The adapter 20285 may also include a plurality of sensors 20286 (one shown) disposed thereabout to detect various conditions of the adapter 20285 or of the environment (e.g., it the adapter 20285 is connected to a loading unit, if the adapter 20285 is connected to a handle, if the drive shafts are rotating, the torque of the drive shafts, the strain of the drive shafts, the temperature within the adapter 20285, a number of firings of the adapter 20285, a peak force of the adapter 20285 during firing, a total amount of force applied to the adapter 20285, a peak retraction force of the adapter 20285, a number of pauses of the adapter 20285 during firing, etc.). The plurality of sensors 20286 may provide an input to the adapter identification device 20284 in the form of data signals. The data signals of the plurality of sensors 20286 may be stored within or be used to update the adapter data stored within the adapter identification device 20284. The data signals of the plurality of sensors 20286 may be analog or digital. The plurality of sensors 20286 may include a force gauge to measure a force exerted on the loading unit 20287 during firing.

The handle 20297 and the adapter 20285 can be configured to interconnect the adapter identification device 20284 and the loading unit identification device 20288 with the controller 20298 via an electrical interface. The electrical interface may be a direct electrical interface (i.e., include electrical contacts that engage one another to transmit energy and signals therebetween). Additionally, or alternatively, the electrical interface may be a non-contact electrical interface to wirelessly transmit energy and signals therebetween (e.g., inductively transfer). It is also contemplated that the adapter identification device 20284 and the controller 20298 may be in wireless communication with one another via a wireless connection separate from the electrical interface.

The handle 20297 may include a transceiver 20283 that is configured to transmit instrument data from the controller 20298 to other components of the system 20280 (e.g., the LAN 20292, the cloud 20293, the console 20294, or the portable device 20296). The controller 20298 may also transmit instrument data and/or measurement data associated with one or more sensors 20286 to a surgical hub. The transceiver 20283 may receive data (e.g., cartridge data, loading unit data, adapter data, or other notifications) from the surgical hub 20270. The transceiver 20283 may receive data (e.g., cartridge data, loading unit data, or adapter data) from the other components of the system 20280. For example, the controller 20298 may transmit instrument data including a serial number of an attached adapter (e.g., adapter 20285) attached to the handle 20297, a serial number of a loading unit (e.g., loading unit 20287) attached to the adapter 20285, and a serial number of a multi-fire fastener cartridge loaded into the loading unit to the console 20294. Thereafter, the console 20294 may transmit data (e.g., cartridge data, loading unit data, or adapter data) associated with the attached cartridge, loading unit, and adapter, respectively, back to the controller 20298. The controller 20298 can display messages on the local instrument display or transmit the message, via transceiver 20283, to the console 20294 or the portable device 20296 to display the message on the display 20295 or portable device screen, respectively.

Figure 7:
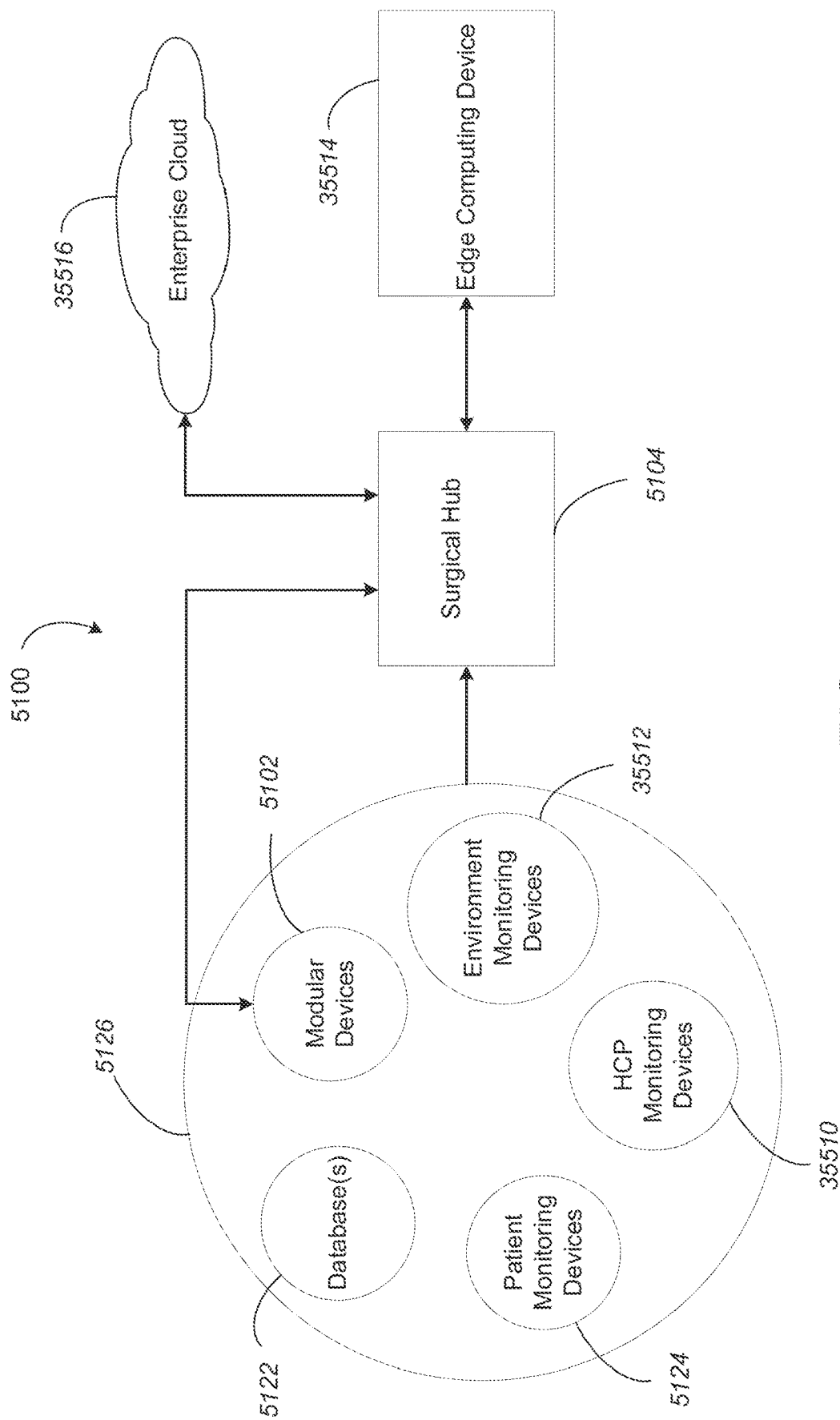
FIG. 7 shows an example situationally aware surgical system.

FIG. 7 illustrates a diagram of a situationally aware surgical system 5100, in accordance with at least one aspect of the present disclosure. The data sources 5126 may include, for example, the modular devices 5102 (which can include sensors configured to detect parameters associated with the patient, HCPs and environment and/or the modular device itself), databases 5122 (e.g., an EMR database containing patient records), patient monitoring devices 5124 (e.g., a blood pressure (BP) monitor and an electrocardiography (EKG) monitor), HCP monitoring devices 35510, and/or environment monitoring devices 35512. The surgical hub 5104 can be configured to derive the contextual information pertaining to the surgical procedure from the data based upon, for example, the particular combination(s) of received data or the particular order in which the data is received from the data sources 5126. The contextual information inferred from the received data can include, for example, the type of surgical procedure being performed, the particular step of the surgical procedure that the surgeon is performing, the type of tissue being operated on, or the body cavity that is the subject of the procedure. This ability by some aspects of the surgical hub 5104 to derive or infer information related to the surgical procedure from received data can be referred to as "situational awareness." For example, the surgical hub 5104 can incorporate a situational awareness system, which is the hardware and/or programming associated with the surgical hub 5104 that derives contextual information pertaining to the surgical procedure from the received data and/or a surgical plan information received from the edge computing system 35514 or an enterprise cloud server 35516.

The situational awareness system of the surgical hub 5104 can be configured to derive the contextual information from the data received from the data sources 5126 in a variety of different ways. For example, the situational awareness system can include a pattern recognition system, or machine learning system (e.g., an artificial neural network), that has been trained on training data to correlate various inputs (e.g., data from database(s) 5122, patient monitoring devices 5124, modular devices 5102, HCP monitoring devices 35510, and/or environment monitoring devices 35512) to corresponding contextual information regarding a surgical procedure. A machine learning system can be trained to accurately derive contextual information regarding a surgical procedure from the provided inputs. In examples, the situational awareness system can include a lookup table storing pre-characterized contextual information regarding a surgical procedure in association with one or more inputs (or ranges of inputs) corresponding to the contextual information. In response to a query with one or more inputs, the lookup table can return the corresponding contextual information for the situational awareness system for controlling the modular devices 5102. In examples, the contextual information received by the situational awareness system of the surgical hub 5104 can be associated with a particular control adjustment or set of control adjustments for one or more modular devices 5102. In examples, the situational awareness system can include a further machine learning system, lookup table, or other such system, which generates or retrieves one or more control adjustments for one or more modular devices 5102 when provided the contextual information as input.

A surgical hub 5104 incorporating a situational awareness system can provide a number of benefits for the surgical system 5100. One benefit may include improving the interpretation of sensed and collected data, which would in turn improve the processing accuracy and/or the usage of the data during the course of a surgical procedure. To return to a previous example, a situationally aware surgical hub 5104 could determine what type of tissue was being operated on; therefore, when an unexpectedly high force to close the surgical instrument's end effector is detected, the situationally aware surgical hub 5104 could correctly ramp up or ramp down the motor of the surgical instrument for the type of tissue.

The type of tissue being, operated can affect the adjustments that are made to the compression rate and load thresholds of a surgical stapling and cutting instrument for a particular tissue gap measurement. A situationally aware surgical hub 5104 could infer whether a surgical procedure being performed is a thoracic or an abdominal procedure, allowing the surgical hub 5104 to determine whether the tissue clamped by an end effector of the surgical stapling and cutting instrument is lung (for a thoracic procedure) or stomach (for an abdominal procedure) tissue. The surgical hub 5104 could then adjust the compression rate and load thresholds of the surgical stapling and cutting instrument appropriately for the type of tissue.

The type of body cavity being operated in during an insufflation procedure can affect the function of a smoke evacuator. A situationally aware surgical hub 5104 could determine whether the surgical site is under pressure (by determining that the surgical procedure is insufflation) and determine the procedure type. As a procedure type can be generally performed in a specific body cavity, the surgical hub 5104 could then control the motor rate of the smoke evacuator appropriately for the body cavity being operated in. Thus, a situationally aware surgical hub 5104 could provide a consistent amount of smoke evacuation for both thoracic and abdominal procedures.

The type of procedure being performed can affect the optimal energy level for an ultrasonic surgical instrument or radio frequency (RF) electrosurgical instrument to operate at. Arthroscopic procedures, for example, may require higher energy levels because the end effector of the ultrasonic surgical instrument or RF electrosurgical instrument is immersed fluid. A situationally aware surgical hub 5104 could determine whether the surgical procedure is an arthroscopic procedure. The surgical hub 5104 could then adjust the RF power level or the ultrasonic amplitude of the generator (e.g., "energy level") to compensate for the fluid filled environment. Relatedly, the type of tissue being operated on can affect the optimal energy level for an ultrasonic surgical instrument or RF electrosurgical instrument to operate at. A situationally aware surgical hub 5104 could determine what type of surgical procedure is being performed and then customize the energy level for the ultrasonic surgical instrument or RF electrosurgical instrument, respectively, according to the expected tissue profile for the surgical procedure. Furthermore, a situationally aware surgical hub 5104 can be configured to adjust the energy level for the ultrasonic surgical instrument or RF electrosurgical instrument throughout the course of a surgical procedure, rather than just on a procedure-by-procedure basis. A situationally aware surgical hub 5104 could determine what step of the surgical procedure is being performed or will subsequently be performed and then update the control algorithms for the generator and/or ultrasonic surgical instalment or RF electrosurgical instrument to set the energy level at a value appropriate for the expected tissue type according to the surgical procedure step.

In examples, data can be drawn from additional data sources 5126 to improve the conclusions that the surgical hub 5104 draws from one data source 5126. A situationally aware surgical hub 5104 could augment data that it receives from the modular devices 5102 with contextual information that it has built up regarding the surgical procedure from other data sources 5126. For example, a situationally aware surgical hub 5104 can be configured to determine whether hemostasis has occurred (e.g., whether bleeding at a surgical site has stopped) according to video or image data received from a medical imaging device. The surgical hub 5104 can be further configured to compare a physiologic measurement (e.g., blood pressure sensed by a BP monitor communicably connected to the surgical hub 5104) with the visual or image data of hemostasis (e.g., from a medical imaging device communicably coupled to the surgical hub 5104) to make a determination on the integrity of the staple line or tissue weld. The situational awareness system of the surgical hub 5104 can consider the physiological measurement data to provide additional context in analyzing the visualization data. The additional context can be useful when the visualization data may be inconclusive or incomplete on its own.

For example, a situationally aware surgical hub 5104 could proactively activate the generator to which an RF electrosurgical instrument is connected if it determines that a subsequent step of the procedure requires the use of the instrument. Proactively activating the energy source can allow the instrument to be ready for use as soon as the preceding step of the procedure is completed.

The situationally aware surgical hub 5104 could determine whether the current or subsequent step of the surgical procedure requires a different view or degree of magnification on the display according to the feature(s) at the surgical site that the surgeon is expected to need to view. The surgical hub 5104 could proactively change the displayed view (supplied by, e.g., a medical imaging device for the visualization system) accordingly so that the display automatically adjusts throughout the surgical procedure.

The situationally aware surgical hub 5104 could determine which step of the surgical procedure is being performed or will subsequently be performed and whether particular data or comparisons between data will be required for that step of the surgical procedure. The surgical hub 5104 can be configured to automatically call up data screens based upon the step of the surgical procedure being performed, without waiting for the surgeon to ask for the particular information.

Errors may be checked during the setup of the surgical procedure or during the course of the surgical procedure. For example, the situationally aware surgical hub 5104 could determine whether the operating theater is setup properly or optimally for the surgical procedure to be performed. The surgical hub 5104 can be configured to determine the type of surgical procedure being performed, retrieve the corresponding checklists, product location, or setup needs (e.g., from a memory), and then compare the current operating theater layout to the standard layout for the type of surgical procedure that the surgical hub 5104 determines is being performed. In some exemplifications, the surgical hub 5104 can compare the list of items for the procedure and/or a list of devices paired with the surgical hub 5104 to a recommended or anticipated manifest of items and/or devices for the given surgical procedure. If there are any discontinuities between the lists, the surgical hub 5104 can provide an alert indicating that a particular modular device 5102, patient monitoring device 5124, HCP monitoring devices 35510, environment monitoring devices 35512, and/or other surgical item is missing. In some examples, the surgical hub 5104 can determine the relative distance or position of the modular devices 5102 and patient monitoring devices 5124 via proximity sensors, for example. The surgical hub 5104 can compare the relative positions of the devices to a recommended or anticipated layout for the particular surgical procedure. If there are any discontinuities between the layouts, the surgical hub 5104 can be configured to provide an alert indicating that the current layout for the surgical procedure deviates from the recommended layout.

The situationally aware surgical hub 5104 could determine whether the surgeon (or other HCP(s)) was making an error or otherwise deviating from the expected course of action during the course of a surgical procedure. For example, the surgical hub 5104 can be configured to determine the type of surgical procedure being performed, retrieve the corresponding list of steps or order of equipment usage (e.g., from a memory), and then compare the steps being performed or the equipment being used during the course of the surgical procedure to the expected steps or equipment for the type of surgical procedure that the surgical hub 5104 determined is being performed. The surgical hub 5104 can provide an alert indicating that an unexpected action is being performed or an unexpected device is being utilized at the particular step in the surgical procedure.

The surgical instruments (and other modular devices 5102) may be adjusted for the particular context of each surgical procedure (such as adjusting to different tissue types) and validating actions during a surgical procedure. Next steps, data, and display adjustments may be provided to surgical instruments (and other modular devices 5102) in the surgical theater according to the specific context of the procedure.

Figure 8:
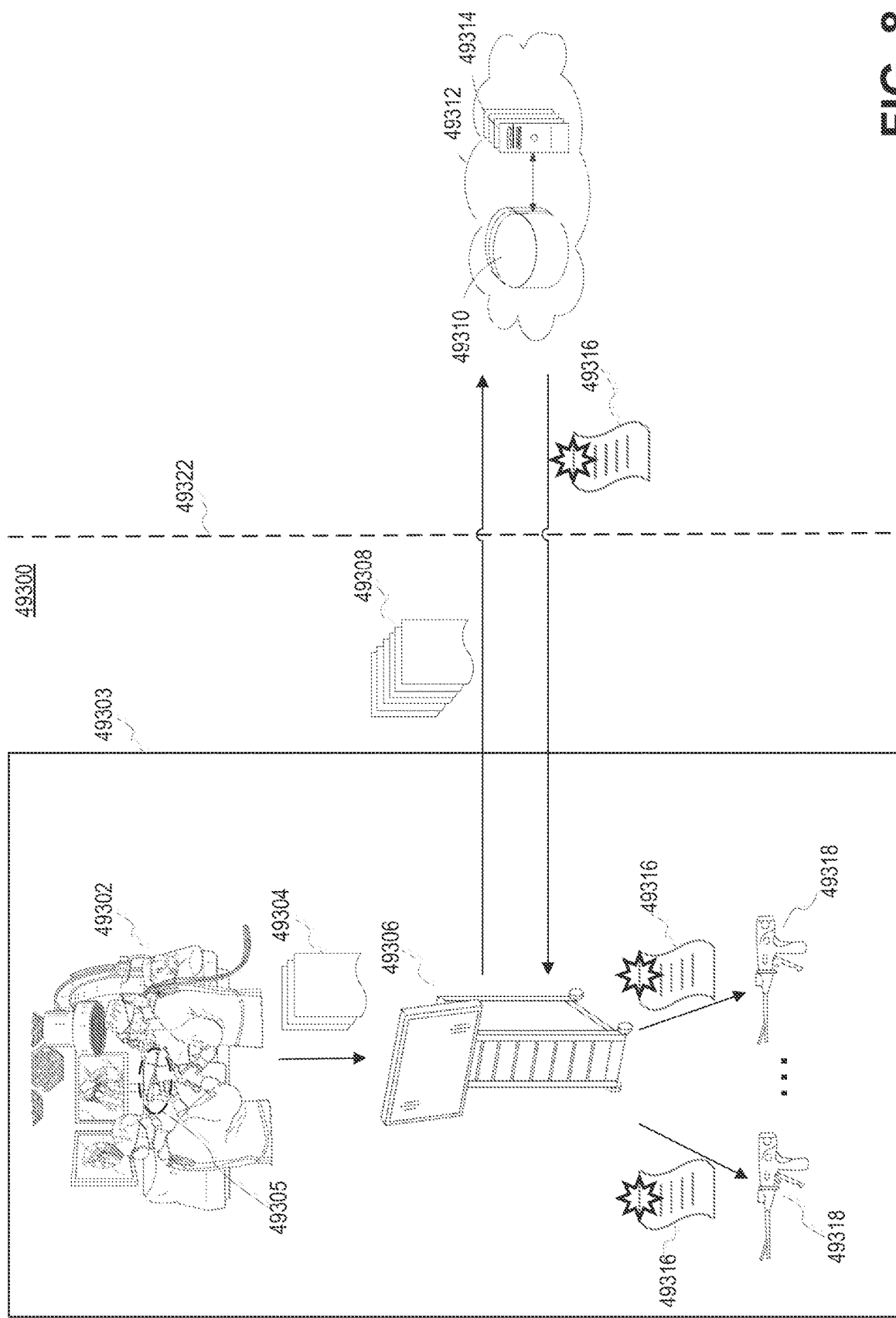
FIG. 8 illustrates an example process of autonomous update of surgical device control algorithm.

FIG. 8 illustrates an example of autonomous update of surgical device control algorithm(s), 49300. Control algorithm(s) may be pre-installed on a surgical device as the surgical device is manufactured. Each pre-installed control algorithm may be a baseline version and may be ready to be executed when the surgical device is operated as part of a surgical procedure. Each pre-installed control algorithm may be specific to a surgical device type associated with the surgical device. As shown, a surgical device 49305 (e.g., a modular device 9050 as described in FIG. 9) may be used in a surgical procedure 49302 in operas in room 49303. For example, surgical device 49305 may be a surgical stapler that is preinstalled with a baseline control algorithm associated with controlling force-to-close (FTC) and/or a baseline control algorithm associated with controlling force-to-fire (FTF), or a baseline control algorithm associated with controlling FTC and FTF. Surgical device 49305 may be any of the modular devices, as described herein.

When surgical device 49305 is activated in operating room 49303, surgical device 49305 may communicate (e.g., pair or link) with surgical hub 49306 (e.g., before surgical device 49305 is operated as part of the surgical procedure 49302). It may be determined whether the activated surgical device's 49305 preinstalled baseline control algorithm(s) is the latest version, e.g., in response to surgical device's 49305 communicating with the surgical hub 49306. In some examples, the surgical hub 49306 may push a latest version (e.g., an up-to-date version) of the control algorithm to surgical device 49305. Surgical device 49305, in response, may determine whether the preinstalled baseline control algorithm is a same version as the last version of the control algorithm. If it is determined that the preinstalled baseline control algorithm is an older version, surgical device 49305 may replace it with the latest version from surgical hub 49306; otherwise, surgical device 49305 discards the latest version from surgical hub 49306. In some examples, the surgical device 49305 may communicate with surgical hub 49306 to determine whether its preinstalled baseline control algorithm(s) is the latest version. The surgical device 49305 may request version information of the control algorithm that is available on surgical hub 49306. If the version information indicates that the preinstalled baseline control algorithm is not the latest version, the surgical device 49305 may retrieve from surgical hub the latest version of the control algorithm.

Surgical device 49305 may be operated (e.g., by a surgeon) in the surgical procedure 49302, which may be a lung segmentectomy. Perioperative data, such as operation data associated with the surgical device 49305, may be sensed by surgical device 49305. For example, the operation data may include the wait time before a firing is initiated. The operation data may include the FTC over time. The operation data include the FTP over time. The operation data may be sent to surgical hub 49306. Perioperative data, such as outcome data of surgical procedure 49302, may be sent to surgical hub 49306. For example, the outcome data may include data indicating whether there was air or fluid leakage at the surgical site, whether the staples of a particular staple line were formed properly, and/or whether there was bleeding at the surgical site. The operation data and outcome data may be paired as paired data 49304. The paired data 49304 may further include control algorithm information that is associated with the operation data. For example, the control algorithm information may include a unique identifier and a version number of the control algorithm that controls FTC. Perioperative data are described in greater detail in FIG. 194's detailed description in U.S. Patent Application Publication No. US 20190206562 A1 (U.S. patent application Ser. No. 16/209,416), titled Method of hub communication, processing, display, and cloud analytics, filed Dec. 4, 2018, the disclosure of which is herein incorporated by reference in its entirety.

Surgical hub 49306 may send paired data 49304 associated with surgical procedure 49302 to a remote system 49312. The remote system may include remote server 49314 (e.g., an analytics server 9070 described in FIG. 9) coupled to a storage device 49310. The remote system may be a cloud computing system, e.g., 9100 as described in FIGS. 15 and 17.

Surgical hub 49306 may send to remote system 41312 paired data 49308 associated with a plurality of surgical procedures 41302 (e.g., after having accumulated paired data 49304 from different surgical procedures over a period of time). The plurality of surgical procedures may be of one surgical procedure type or more than one surgical procedure type. Surgical hub 49306 may send to remote system 49312 other perioperative data associated with the plurality of surgical procedures 49302, such as preoperative data, that includes patient-specific information (e.g., age, employer, body mass index (BMI), or any data that can be used to ascertain the identity of a patient).

In an example, the surgical hub 49306 may be located within a data protection boundary 49322 associated with a medical facility (e.g., a hospital), such as a Health Insurance Portability and Accountability Act (HIPAA) boundary. Surgical hub 49306 may redact paired data 49308 before sending it to remote system 49312 if paired data 49304 includes patient private information, such as age, employer, body mass index (BMI), or any data that can be used to ascertain the identity of a patient. The redaction process is described in greater detail under the heading of "Data Management and Collection" U.S. Patent Application Publication No. US 20190206562 A1 (U.S. patent application Ser. No. 16/209,385), titled Method of hub communication, processing, storage and display, filed Dec. 4, 2018, the disclosure of which is herein incorporated by reference in its entirety.

Remote system 49312 may receive paired data 49308. The remote system 49312 (e.g., in response) may aggregate and/or analyze the received paired data 49308 to determine whether there are correlation(s) between operation data and outcome data. Remote system 49312 may determine that an update is needed for a control algorithm associated with a surgical device type (e.g., a surgical stapler) based on a determination that there is a correlation between the operation data and the outcome data. For example, if remote system 49312 determines there is a correlation between an aspect of a control algorithm and a negative outcome, remote system 49312 may determine an updated control algorithm 49316 of a surgical device type is needed and may generate the updated control algorithm 49316.

The remote system 49312 (e.g., in response to generating tile updated control algorithm 49316) may send the updated control algorithm 49316 to surgical hub 49306. In response to receiving the updated control algorithm 49316, surgical hub 49306 may push it to paired surgical device(s) 49318 that of the surgical device type that is associated with the updated control algorithm 49316 (e.g., if a corresponding control algorithm installed on the paired surgical device(s) 49318 is an older version of the control algorithm 49316). For example, when a new surgical device communicates (e.g., pairs) with surgical hub 49306, the surgical hub 49306 may push the updated control algorithm 49316 to the newly added surgical device. In an example, the surgical hub 49306 may push the updated control algorithm. 49316 to the newly added surgical device and not to the surgical devices that are in communication with the surgical hub and have already received the updated control algorithm 49316. In some examples, surgical hub 49306 may push the updated control algorithm to the paired surgical devices that are in communication with the surgical hub 49306. The paired surgical devices may determine whether to update the corresponding algorithm installed on them, e.g., as described herein.

Figure 9:
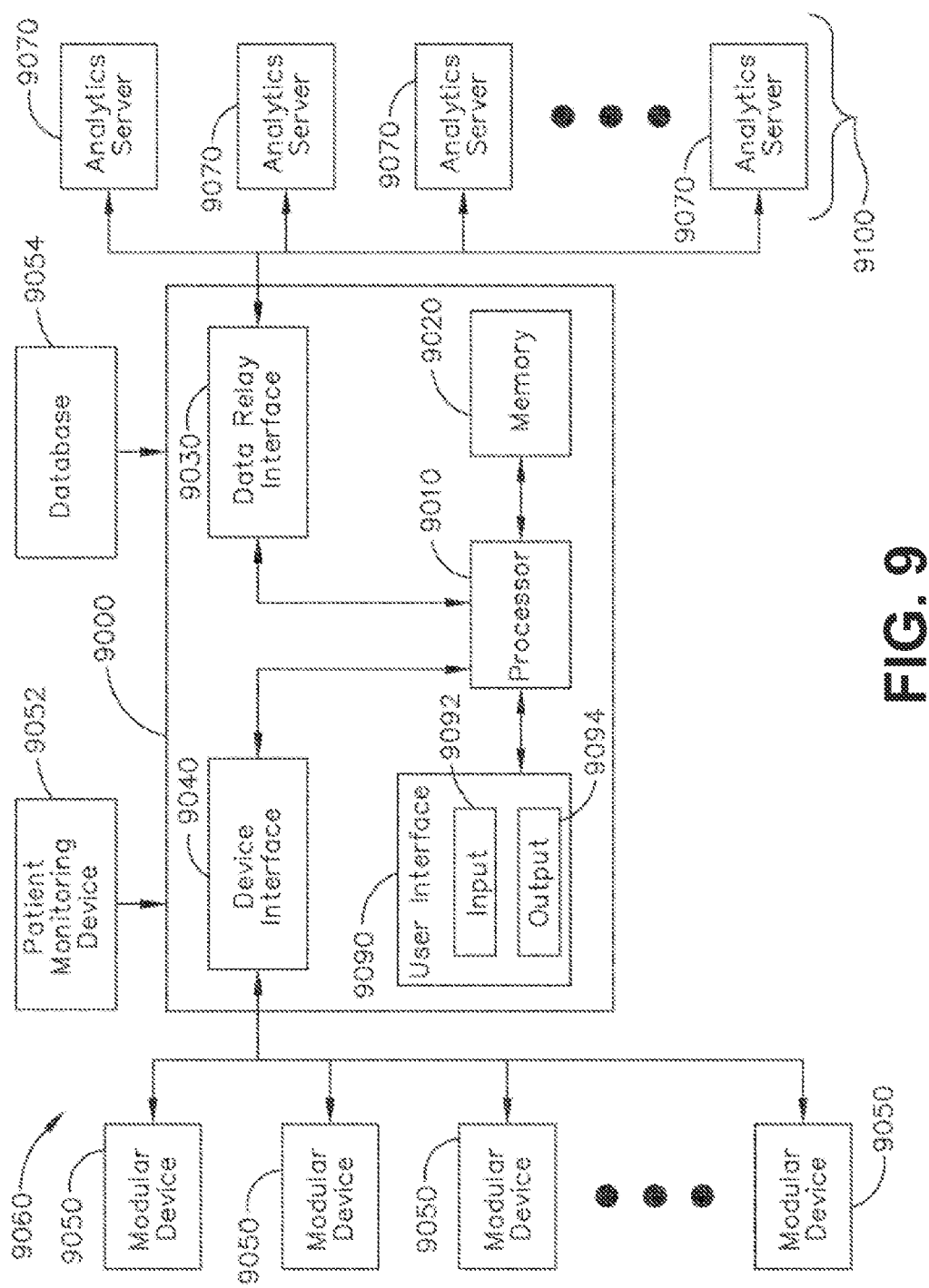
FIG. 9 illustrates a block diagram of a computer-implemented adaptive surgical system.

FIG. 9 illustrates a block diagram of a computer-implemented adaptive surgical system 9060 that is configured to adaptively generate control program updates for modular devices 9050, in accordance with at least one aspect of the present disclosure.

Modular devices include the modules (as described in connection with FIGS. 3 and 9, for example) that are receivable within a surgical hub and the surgical devices or instruments that can be connected to the various modules. The modular devices include, for example, intelligent surgical instruments, medical imaging devices, suction/irrigation devices, smoke evacuators, energy generators, ventilators, and insufflators. Various operations of the modular devices described herein can be controlled by one or more control algorithms. The control algorithms can be executed on the modular device itself, on the surgical hub to which the particular modular device is paired, or on both the modular device and the surgical hub (e.g., via a distributed computing architecture). In some exemplifications, the modular devices' control algorithms may control the devices; based on data sensed by the modular device itself (i.e., by sensors in, on, or connected to the modular device). This data can be related to the patient being operated on (e.g., tissue properties or insufflation pressure) or the modular device itself (e.g., the rate at which a knife is being advanced, motor current, or energy levels). For example, a control algorithm for a surgical stapling and cutting instrument can control the rate at which the instrument's motor drives its knife through tissue according to resistance encountered by the knife as it advances.

Although an "intelligent" device including control algorithms that respond to sensed data can be an improvement over a "dumb" device that operates without accounting for sensed data, if the device's control program does not adapt or update over time in response to collected data, then the devices may continue to repeat errors or otherwise perform suboptimally. In an example, operational data collected by the modular devices may be combined with the outcomes of each procedure (or step thereof). The combination may be transmitted to an analytics system. In one exemplification, the procedural outcomes can be inferred by a situational awareness system of a surgical hub to which the modular devices are paired, as described in U.S. patent application Ser. No. 15/940,654, titled SURGICAL HUB SITUATIONAL AWARENESS, which is herein incorporated by reference in its entirety. The analytics system can analyze the data aggregated from a set of modular devices or a particular type of modular device to determine under what conditions the control programs of the analyzed modular devices are controlling the modular devices suboptimally (e.g., if there are repeated faults or errors in the control program or if an alternative algorithm performs in a superior manner; or under what conditions medical personnel are utilizing the modular devices suboptimally The analytics system can then generate an update to fix or improve the modular devices' control programs. Different types of modular devices can be controlled by different control programs; therefore, the control program updates can be specific to the type of modular device that the analytics system determines is performing suboptimally. The analytics system can then push the update to the appropriate modular devices connected to the analytics system through the surgical hubs.

In one exemplification, the surgical system includes a surgical hub 9000, multiple modular devices 9050 communicably coupled to the surgical hub 9000, and an analytics system 9100 communicably coupled to the surgical hub 9000. Although a single surgical hub 9000 is depicted, it should be noted that the surgical system 9060 can include any number of surgical hubs 9000, which can be connected to form a network of surgical hubs 9000 that are communicably coupled to the analytics system 9010. In one exemplification, the surgical hub 9000 includes a processor 9010 coupled to a memory 9020 for executing instructions stored thereon and a data relay interface 9030 through which data is transmitted to the analytics system 9100. In one exemplification, the surgical hub 9000 further includes a user interface 9090 having an input device 9092, (e.g., a capacitive touchscreen or a keyboard) for receiving inputs from a user and an output device 9094 (e.g., a display screen) for providing outputs to a user. Outputs can include data from a query input by the user, suggestions for products or mixes of products to use in a given procedure, and/or instructions for actions to be carried out before, during, or after surgical procedures. The surgical hub 9000 further includes an interface 9040 for communicably coupling, the modular devices 9050 to the surgical hub 9000. In one aspect, the interface 9040 includes a transceiver that is communicably connectable to the modular device 9050 via a wireless communication protocol. The modular devices 9050 can include, for example, surgical stapling and cutting instruments, electrosurgical instruments, ultrasonic instruments, insufflators, respirators, and display screens. In one exemplification, the surgical hub 9000 can further be communicably coupled to one or more patient monitoring devices 9052, such as EKG monitors or BP monitors. In another exemplification, the surgical hub 9000 can further be communicably coupled to one or more databases 9054 or external computer systems, such as an EMR database of the medical facility at which the surgical hub 9000 is located.

When the modular devices 9050 are connected to the surgical hub 9000, the surgical hub 9000 can sense or receive perioperative data from the modular devices 9050 and then associate the received perioperative data with surgical procedural outcome data. The perioperative data indicates how the modular devices 9050 were controlled during the course of a surgical procedure. The procedural outcome data includes data associated with a result from the surgical procedure (or a step thereof), which can include whether the surgical procedure (or a step thereof) had a positive or negative outcome. For example, the outcome data could include whether a patient suffered from postoperative complications from a particular procedure or whether there was leakage (e.g., bleeding or air leakage) at a particular staple or incision line. The surgical hub 9000 can obtain the surgical procedural outcome data by receiving the data from an external source (e.g., from an EMR database 9054), by directly detecting the outcome (e.g., via one of the connected modular devices 9050), or inferring the occurrence of the outcomes through a situational awareness system. For example, data regarding postoperative complications could be retrieved from an EMR database 9054 and data regarding staple or incision line leakages could be directly detected or inferred by a situational awareness system. The surgical procedural outcome data can be inferred by a situational awareness system from data received from a variety of data sources, including the modular devices 9050 themselves, the patient monitoring device 9052, and the databases 9054 to which the surgical hub 9000 is connected.

The surgical hub 9000 can transmit the associated modular device 9050 data and outcome data to the analytics system 9100 for processing thereon. By transmitting both the perioperative data indicating how the modular devices 9050 are controlled and the procedural outcome data, the analytics system 9100 can correlate the different manners of controlling the modular devices 9050 with surgical outcomes for the particular procedure type. In one exemplification, the analytics system 9100 includes a network of analytics servers 9070 that are configured to receive data from the surgical hubs 9000. Each of the analytics servers 9070 can include a memory and a processor coupled to the memory that is executing instructions stored thereon to analyze the received data. In some exemplifications, the analytics servers 9070 are connected in a distributed computing architect and/or utilize a cloud computing architecture. Based on this paired data, the analytics system 9100 can then learn optimal or preferred operating parameters for the various types of modular devices 9050, generate adjustments to the control programs of the modular devices 9050 in the field, and then transmit (or "push") updates to the modular devices' 9050 control programs.

Additional detail regarding the computer-implemented interactive surgical system 9060, including the surgical hub 9000 and various modular devices 9050 connectable thereto, are described herein.

In order to assist in the understanding of the process 9100 illustrated in FIG. 9 and the other concepts discussed above, FIG. 10 illustrates a diagram of an illustrative analytics system 9100 updating a surgical instrument control program, in accordance with at least one aspect of the present disclosure. In one exemplification, a surgical hub 9000 or network of surgical hubs 9000 is communicably coupled to an analytics system 9100, as illustrated above in FIG. 9. The analytics system 9100 is configured to filter and analyze modular device 9050 data associated with surgical procedural outcome data to determine whether adjustments need to be made to the control programs of the modular devices 9050. The analytics system 9100 can then push updates to the modular devices 9050 through the surgical hubs 9000, as necessary. In the depicted exemplification, the analytics system 9100 comprises a cloud computing architecture. The modular device 9050 perioperative data received by the surgical 9000 hubs from their paired modular devices 9050 can include, for example, force to fire (i.e., the force required to advance a cutting member of a surgical stapling instrument through a tissue), force to close (i.e., the force required to clamp the jaws of a surgical stapling instrument on a tissue), the power algorithm (i.e., change in power over time of electrosurgical or ultrasonic instruments in response to the internal states of the instrument and/or tissue conditions), tissue properties (e.g., impedance, thickness, stiffness, etc.), tissue gap (i.e., the thickness of the tissue), and closure rate (i.e., the rate at which the jaws of the instrument clamped shut). It should be noted that the modular device 9050 data that is transmitted to the analytics system 9100 is not limited to a single type of data and can include multiple different data types paired with procedural outcome data. The procedural outcome data for a surgical procedure (or step thereof) can include, for example, whether there was bleeding at the surgical site, whether there was air or fluid leakage at the surgical site, and whether the staples of a particular staple line were formed properly. The procedural outcome data can further include or be associated with a positive or negative outcome, as determined by the surgical hub 9000 or the analytics system 9100, for example. The modular device 9050 data and the procedural outcome data corresponding to the modular device 9050 perioperative data can be paired together or otherwise associated with each other when they are uploaded to the analytics system 9100 so that the analytics system 9100 is able to recognize trends in procedural outcomes based on the underlying data of the modular devices 9050 that produced each particular outcome. In other words, the analytics system 9100 can aggregate the modular device 9050 data and the procedural outcome data to search for trends or patterns in the underlying device modular data 9050 that can indicate adjustments that can be made to the modular devices' 9050 control programs.

In the depicted exemplification, the analytics system 9100 executing the process 9200 described in connection with FIG. 9 is receiving 9202 modular device 9050 data and procedural outcome data. When transmitted to the analytics system 9100, the procedural outcome data can be associated or paired with the modular device 9050 data corresponding to the operation of the modular device 9050 that caused the particular procedural outcome. The modular device 9050 perioperative data and corresponding procedural outcome data can be referred to as a data pair. The data is depicted as including a first group 9212 of data associated with successful procedural outcomes and a second group 9214 of data associated with negative procedural outcomes. For this particular exemplification, a subset of the data 9212, 9214 received 9202 by the analytics system 9100 is highlighted to further elucidate the concepts discussed herein.

For a first data pair 9212 a, the modular device 9050 data includes the force to close (FTC) over time, the force to fire (FTF) over time, the tissue type (parenchyma), the tissue conditions (the tissue is from a patient suffering from emphysema and had been subject to radiation), what number firing this was for the instrument (third), an anonymized tone stamp (to protect patient confidentiality while still allowing the analytics system to calculate elapsed time between firings and other such metrics), and an anonymized patient identifier (002). The procedural outcome data includes data indicating that there was no bleeding, which corresponds to a successful outcome (i.e., a successful firing of the surgical stapling instrument). For a second data pair 9212 b, the modular device 9050 data includes the wait time prior the instrument being fired (which corresponds to the first firing of the instrument), the FTC over time, the FTF over time (which indicates that there was a force spike near the end of the firing stroke), the tissue type (1.1 mm vessel), the tissue conditions (the tissue had been subject to radiation), what number firing this was for the instrument (first), an anonymized time stamp, and an anonymized patient identifier (002), The procedural outcome data includes data indicating that there was a leak, which corresponds to a negative outcome (i.e., a failed firing of the surgical stapling instrument). For a third data pair 9212c, the modular device 9050 data includes the wait time prior the instrument being fired (which corresponds to the first firing of the instrument), the FTC over time, the FTF over time, the tissue type (1.8 mm vessel), the tissue conditions (no notable conditions), what number firing this was for the instrument (first), an anonymized time stamp, and an anonymized patient identifier (012), The procedural outcome data includes data indicating that there was a leak, which corresponds to a negative outcome (i.e., a failed firing of the surgical stapling instrument). It should be noted again that this data is intended solely for illustrative purposes to assist in the understanding of the concepts discussed herein and should not be interpreted to limit the data that is received and/or analyzed by the analytics system 9100 to generate control program updates.

When the analytics system 9100 receives 9202 perioperative data from the communicably connected surgical hubs 9000, the analytics system 9100 proceeds to aggregate and/or store the data according, to the procedure type (or a step thereof) associated with the data, the type of the modular device 9050 that generated the data, and other such categories. By collating the data accordingly, the analytics system 9100 can analyze the data set to identify correlations between particular ways of controlling each particular type of modular device 9050 and positive or negative procedural outcomes. Based upon whether a particular manner of controlling a modular device 9050 correlates to positive or negative procedural outcomes, the analytics system 9100 can determine 9204 whether the control program for the type of modular device 9050 should be updated.

For this particular exemplification, the analytics system 9100 performs a first analysis 9216 of the data set by analyzing the peak FTF 9213 (i.e., the maximum FTF for each particular firing of a surgical stapling instrument) relative to the number of firings 9211 for each peak FTF value. In this exemplary case, the analytics system 9100 can determine that there is no particular correlation between the peak FTF 9213 and the occurrence of positive or negative outcomes for the particular data set. In other words, there are not distinct distributions for the peak FTP 9213 for positive and negative outcomes. As there is no particular correlation between peak FTF 9213 and positive or negative outcomes, the analytics system 9100 would thus determine that a control program update to address this variable is not necessary. Further, the analytics system 9100 performs a second analysis 9216 *b* of the data set by analyzing the wait time 92115 prior to the instrument being fired relative to the number of firings 9211. For this particular analysis 9216 *b*, the analytics system 9100 can determine that there is a distinct negative outcome distribution 9217 and a positive outcome distribution 9219. In this exemplary case, the negative outcome distribution 9217 has a mean of 4 seconds and the positive outcome distribution has a mean of 11 seconds. Thus, the analytics system 9100 can determine that there is a correlation between the wait time 9215 and the type of outcome for this surgical procedure step. Namely, the negative outcome distribution 9217 indicates that there is a relatively large rate of negative outcomes for wait times of 4 seconds or less. Based on this analysis 9216 *b* demonstrating that there is a large divergence between the negative outcome distribution 9217 and the positive outcome distribution 9219, the analytics system 9100 can then determine 9204 that a control program update should be generated 9208.

Once the analytics system 9100 analyzes the data set and determines 9204 that an adjustment to the control program of the particular module device 9050 that is the subject of the data set would improve the performance of the modular device 9050, the analytics system 9100 then generates 9208 a control program update accordingly. In this exemplary case, the analytics system 9100 can determine based on the analysis 9216 *b* of the data set that a control program update 9218 recommending a wait time of more than 5 seconds would prevent 90% of the distribution of the negative outcomes with a 95% confidence interval. Alternatively, the analytics system 9100 can determine based on the analysis 9216 *b* of the data set that a control program update 9218 recommending a wait time of more than 5 seconds would result in the rate of positive outcomes being greater than the rate of negative outcomes. The analytics system 9100 could thus determine that the particular type of surgical instrument should wait more than 5 seconds before being fired under the particular tissue conditions so that negative outcomes are less common than positive outcomes. Based on either or both of these constraints for generating 9208 *a* control program update that the analytics system 9100 determines are satisfied by the analysis 9216 *b*), the analytics system 9100 can generate 9208 a control program update 9218 for the surgical instrument that causes the surgical instrument, under the given circumstances, to either impose a 5 second or longer wait time before the particular surgical instrument can be fired or causes the surgical is to display a warning or recommendation to the user that indicates to the user that the user should wait at least 5 seconds before firing the instrument. Various other constraints can be utilized by the analytics system 9100 in determining whether to generate 9208 *a* control program update, such as whether a control program update would reduce the rate of negative outcomes by a certain percentage or whether a control program update maximizes the rate of positive outcomes.

After the control program update 9218 is generated 9208, the analytics system 9100 then transmits 9210 the control program update 9218 for the appropriate type of modular devices 9050 to the surgical hubs 9000. In one exemplification, when a modular device 9050 that corresponds to the control program update 9218 is next connected to a surgical hub 9000 that has downloaded the control program update 9218, the modular device 9050 then automatically downloads the update 9218. In another exemplification, the surgical hub 9000 controls the modular device 9050 according to the control program update 9218, rather than the control program update 9218 being transmitted directly to the modular device 9050 itself.

Figure 11:
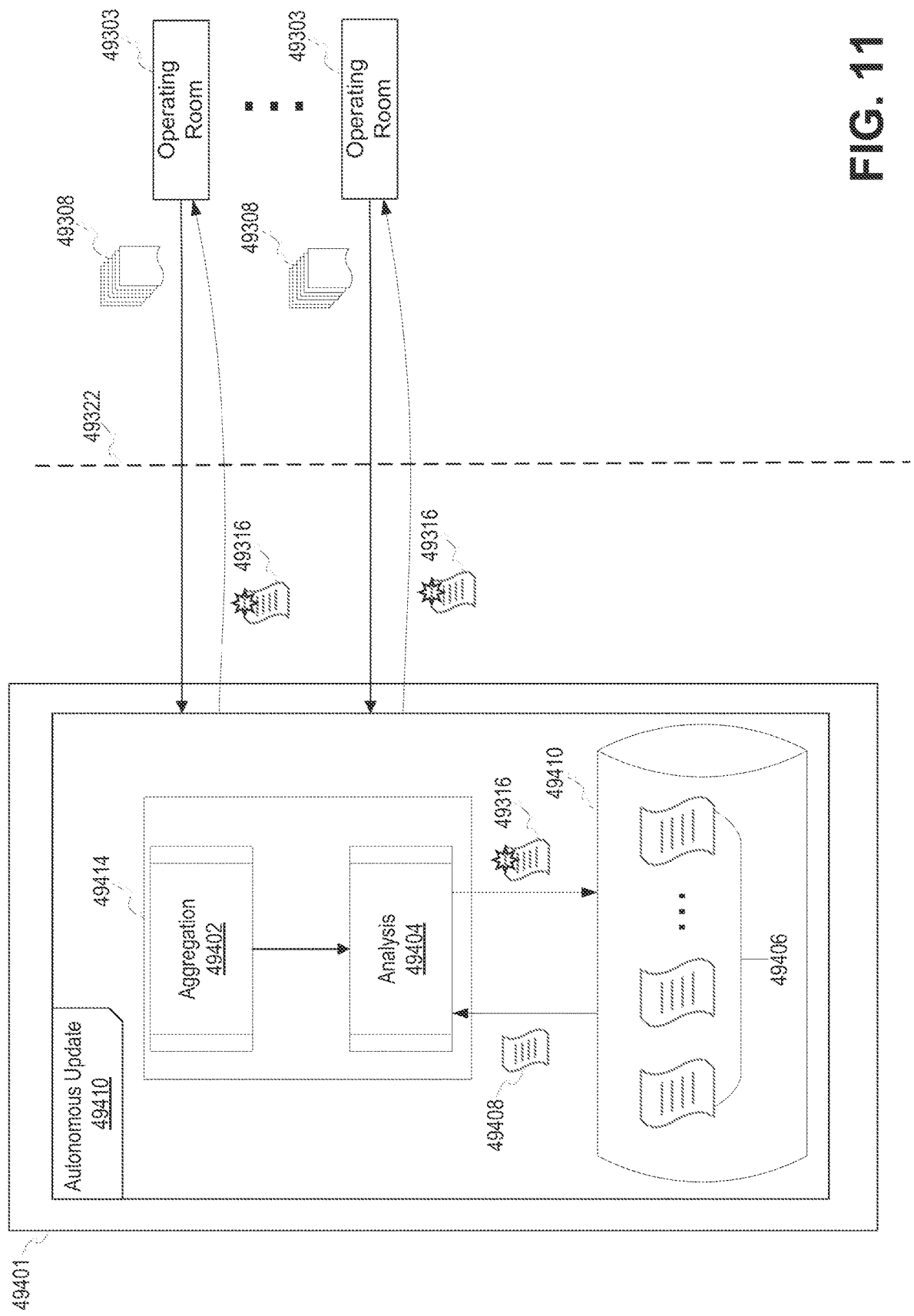
FIG. 11 illustrates an example process of autonomous update of surgical device control algorithm.

FIG. 11 illustrates an example process of autonomous update of surgical device control algorithm. As shown, there may be a plurality of operating rooms 49303 in a medical facility (e.g., a hospital). The plurality of operation rooms 49303 may be within data protection bound 49322 associated with the medical facility (e.g., as described herein). The plurality of operating rooms 49303 (e.g., via surgical hubs 49306) may send paired data 49308 to a remote system 49401 (e.g., beyond the data protection boundary 49322 after redacting patient private information in paired data 49308 as described herein).

Remote system 49401 (e.g., remote system 49312) may include an autonomous update subsystem 49410. Autonomous update subsystem 49410 may include an analytics server 49414 (e.g., 49314 described in FIG. 8) and a datastore 49410 (e.g., 49310 described in FIG. 8). Analytics server 49414 may include an aggregation process 49402 and an analysis process 49404.

Datastore 49410 may store a control algorithm collection 49406. Control algorithm collection 49406 may include latest versions of control algorithms. For example, each surgical device type may have one or more control algorithms associated its operation. Such control algorithms of each surgical device types may be stored in datastore 49410. A unique identifier and a version number of each control algorithm may be stored in datastore 49410.

After remote system 49401 receives paired data 49308, autonomous update subsystem 49410 may determine whether paired data 49308 is to be discarded or used for generation of control algorithm updates. In examples, autonomous update subsystem 49410 may determine whether the control algorithms that are included in paired data 49308 (e.g., control algorithm information associated with the operation data part of paired data 49308) are up to date. If the version numbers associated with the control algorithms indicate they are not the latest version numbers, autonomous update subsystem 49410 may discard them. (e.g., perform no further processing on them). If the version numbers associated with the control algorithms indicate they are the latest version numbers, autonomous update subsystem 49410 may perform further processing on the associated paired data/operation data.

Aggregation process 49402 may aggregate paired data 49308 based on a surgical device type. Aggregation process 49402 may aggregate paired data 49308 based on a surgical procedure type. Aggregation process 49402 may aggregate paired data 49308 based on a surgical device type and a surgical procedure type. Aggregation process 49402 may aggregate paired data 49308 based on any other such categorie(s).

Based on the aggregated paired data, analysis process 49404 may identity correlation(s) between aspect(s) of operation data and outcome data that are associated with a surgical device. For example, analysis process 49404 may perform an analysis (e.g., analysis 9216 *b* in FIG. 10) of the data set by analyzing the wait time 9215 prior to a surgical stapler being fired relative to the number of firings 9211.

Figure 10:
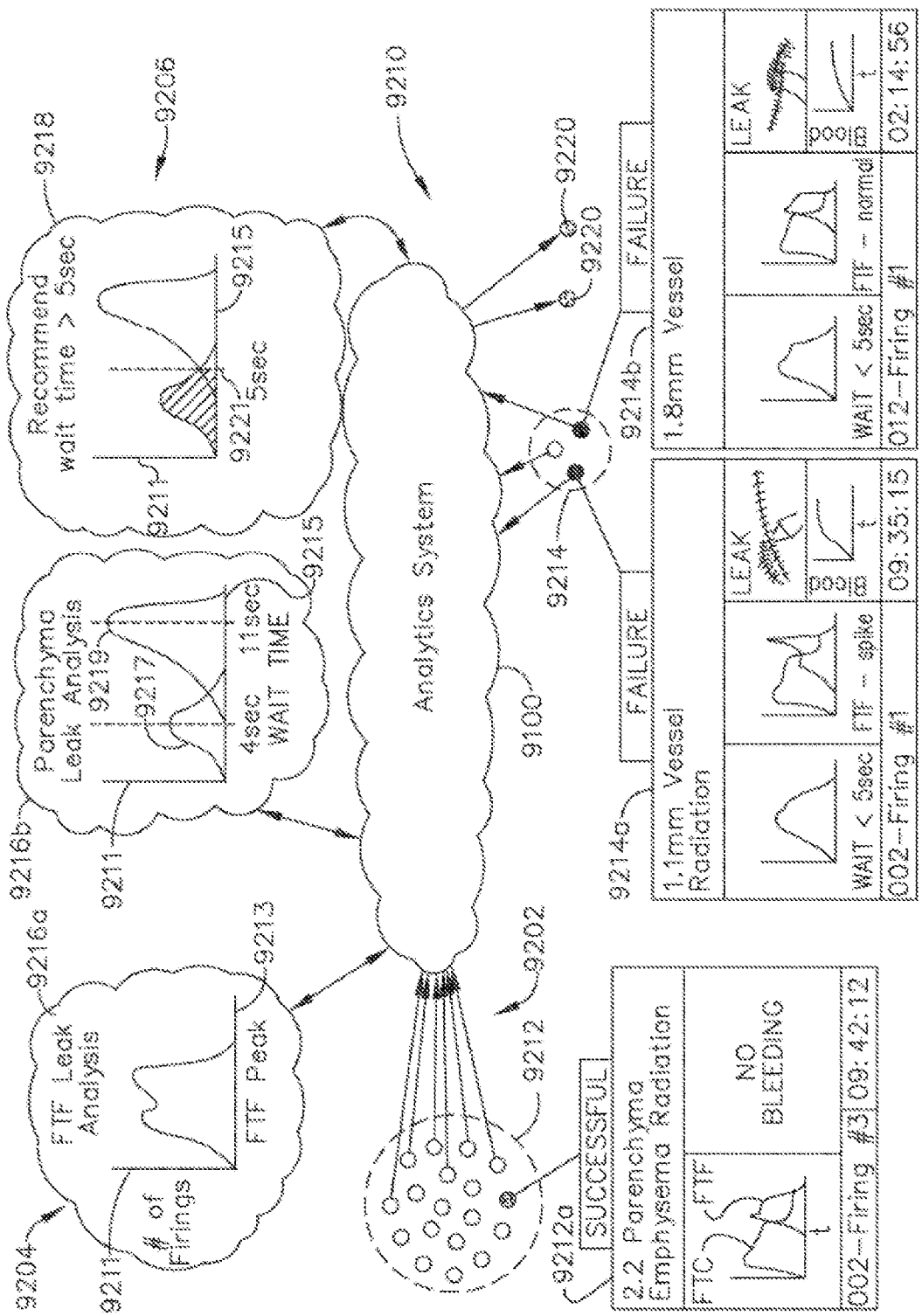
FIG. 10 illustrates a diagram of an illustrative analytics system updating a surgical instrument control program.

Analysis process 49404 may determine that there is a distinct negative outcome distribution (e.g., 9217 in analysis 9216*b* as shown in FIG. 10) and a positive outcome distribution (e.g., 9219 in analysis 9216*b* as shown in FIG. 10). In an example, the negative outcome distribution may have a mean of 4 seconds and the positive outcome distribution may have a mean of 11 seconds. Analysis process 49404 may determine that there is a correlation between the wait time (e.g., 9215 in analysis 9216*b* as shown in FIG. 10) and the type of outcome for this surgical procedure step. That is, the negative outcome distribution may indicate that there is a relatively large rate of negative outcomes for wait times of 4 seconds or less.

Based on this analysis, analysis process 49404 may determine that an update to the control algorithm associated with controlling wait time (e.g., an FTC control algorithm, such as 49408) should be generated for surgical staplers. An updated control algorithm 49316 may be generated and the updated control algorithm 49316 may include a constraint that the wait time before firing must be at least 5 seconds. The undated control algorithm 49316 may be sent to datastore 49406 to update or replace the existing control algorithm 49408. The updated control algorithm 49316 may be sent to the plurality of operating rooms 49303 (e.g., the surgical hubs 49306 in the operating rooms 49303).

Autonomous update subsystem 49410 may autonomously update control algorithms as described herein as remote system 49401 continues receiving paired data 49308 from the plurality of operating rooms 49303. Such paired data 49308 may be received from operating rooms 49303 in a medical facility, medical facilities in a geographic location, medical facilities in a geographic region, or medical facilities in various geographic regions.

In an example, paired data 49308 may be received from a geographic region that did not previously send paired data 49308 to remote system 49401. In such case, paired data 49308 from the geographic region may present different data patterns, e.g., because surgeons/medical professionals may be trained to operate surgical device differently. For example, based on the aggregated paired data (including paired data 49308 from the new geographic region), analysis process 49404 (e.g., in analysis 9216*b* as shown in FIG. 10) may identify in the case of a surgical stapler a new correlation between wait time and outcome data. A negative outcome distribution may emerge as having a mean of 16 seconds. Based on this analysis, analysis process 49404 may determine 9204 that another update to the control algorithm associated with controlling wait time (e.g., an FTC control algorithm, such as 49408) should be generated for surgical staplers. An updated control algorithm 49316 may be generated and the updated control algorithm 49316 may include a constraint that the wait time before firing must be at least 5 seconds and less than 16 seconds. The updated control algorithm 49316 may be sent to datastore 49406 to update or replace the existing control algorithm 49408. The updated control algorithm 49316 may be sent to the plurality of operating rooms 49303 (e.g., the surgical hubs 49306 in the operating rooms 49303).

Figure 12:
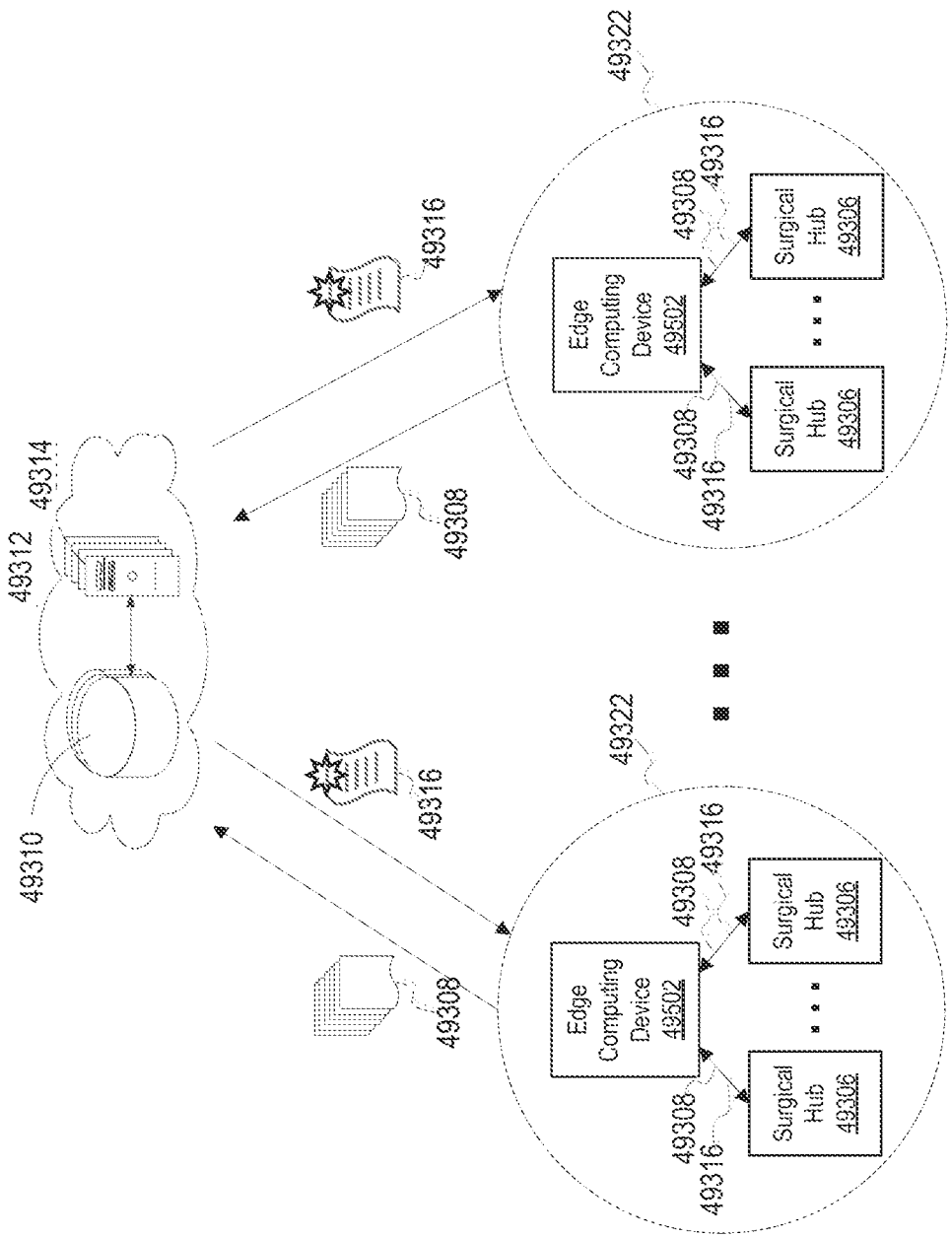
FIG. 12 illustrates an example process of autonomous update of surgical device control algorithm.

FIG. 12 illustrates an example process of autonomous update of surgical device control algorithm. As shown, there may be a plurality of data protection boundaries 49322 associated with the corresponding medical facilities (e.g., as described herein). Surgical hubs 49306 within each 49322 may send paired data 49308 to remote system 49312 (e.g., as described in FIGS. 14 and 17). In response, surgical hubs 49306 may receive updated control algorithms 49316 from remote system 49312 (e.g., as described in FIGS. 14 and 17).

Alternatively, surgical hubs 49306 within each 49322 may send paired data 49308 to an edge computing device 49502 and edge computing device 49502, in response, may aggregate and/or analyze paired data 49308 to determine whether there are correlation(s) between operation data and outcome data. The edge computing device/system is described in greater detail in U.S. patent application Ser. No. 17/384,151, titled MULTI-LEVEL SURGICAL DATA ANALYSIS SYSTEM, filed Jul. 23, 2021, the disclosure of which is herein incorporated by reference in its entirety.

Like remote system 49312 (or remote system 49401), edge computing device 49502 may include autonomous update subsystem 49410, as described in FIG. 11. Edge computing device 49502 may determine that an update is needed for a control algorithm associated with a surgical device type (e.g., a surgical stapler) based on a determination that there is a correlation between the operation data and the outcome data. For example, if edge computing device 49502 determines there is a correlation between an aspect of a control algorithm and a negative outcome, remote system 49312 may determine an updated control algorithm 49316 of a surgical device type is needed and may generate the updated control algorithm 49316. In response to generating the updated control algorithm 49316, edge computing device 49502 may send the updated control algorithm 49316 to surgical hubs 49306.

Unlike remote system 49312, edge computing device 49502 is located within data protection boundary 49322 and, consequently, surgical hubs 49306 may send paired data 49308 in it unredacted form to edge computing device 49502. In such case, aggregation process 49402 of edge computing device 49502 may aggregate unredacted paired data 49308 further based on patient private information and analysis process 49404 may identify correlation(s) between aspect(s) of operation data and outcome data that are associated with a surgical device further based on patient private information. For example, aggregation process 49402 of edge computing device 49502 may aggregated unredacted paired data 49308 by surgical device type and by patient age group. In an example, analysis process 49404 may perform an analysis (e.g., analysis 9216 *b* in FIG. 10) and may identify determine a negative outcome distribution and a positive outcome distribution for each patient age group. In such manner, the updated control algorithm for a surgical stapler (e.g., an updated FTC control algorithm; may include different constraints for different age groups, such as wait tune must be at least 5 seconds for patients that are 20 or younger and wait time must be at least 7 seconds for patients that are between 20 and 50 and wait time must be at least 10 seconds for patients that are older than 50.

Figure 13:
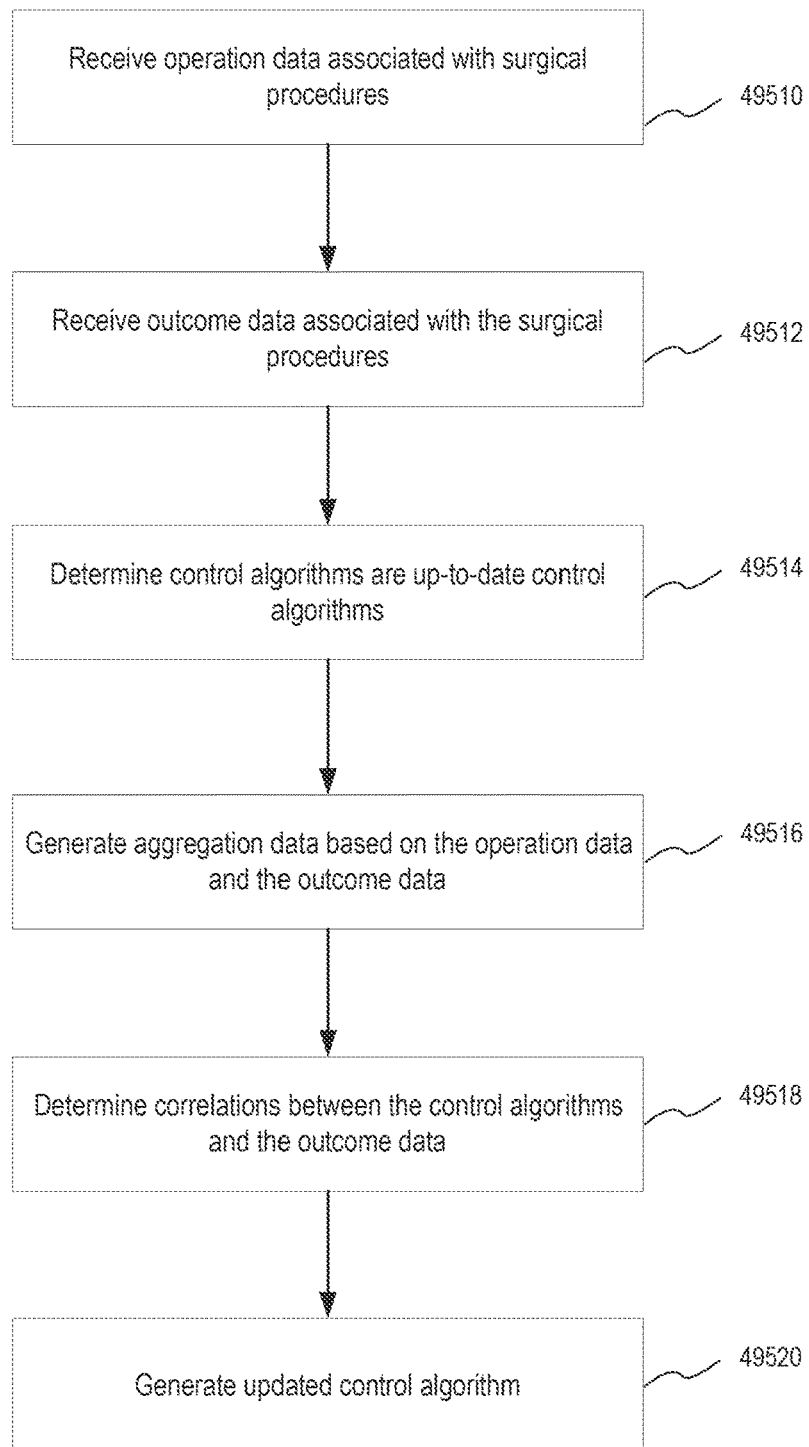
FIG. 13 is a flow chart of an example process of autonomous update of surgical device control algorithm.

FIG. 13 is a flow chart of an example process of autonomous update of surgical device control algorithm, 49500. The process may be performed by remote system 49312 or edge computing device 49502 described in FIG. 12.

At 49510, operation data associated with surgical procedures are received. For example, first operation data associated with a first surgical procedure and second operation data associated with a second surgical procedure may be received. The first operation data may be associated with a first aspect of a control algorithm of a first surgical device. The second operation data may be associated with a first aspect of a control algorithm of a second surgical device. The first surgical device and second surgical device may be of a first surgical device type. For example, the first operation data may be received from the first surgical device and the second operation data may be received from the second surgical device. For example, the first operation data and the second operation data may be received from a surgical hub or two different surgical hubs.

At 49512, outcome data associated with the surgical procedures may be received. For example, first outcome data associated with the first surgical procedure may be received. Second outcome data associated with the second surgical procedure may be received. For example, the first outcome data associated with the first surgical procedure may be received from a surgical hub or a surgical visualization device.

At 49514, control algorithms are determined to be up-to-date control algorithms. For example, each of the control algorithm of the first surgical device and the control algorithm of the second surgical device may be determined to be an up-to-date control algorithm associated with the first surgical device type.

At 49516, aggregation data may be generated based on the operation data and the outcome data. For example, the aggregation data may be generated based on at least the first operation data, the second operation data, the first outcome data, and the second outcome data. For example, the outcome data may comprise the first outcome data and the second outcome data.

At 49518, correlations between the control algorithms and the outcome data may be determined. For example, based on at least the first aggregation data, a correlation may be determined between the first aspect of the up-to-date control algorithm and outcome data.

For example, the determined correlation may comprise a correlation between the first aspect of the up-to-date control algorithm and a negative surgical outcome and a correlation between the first aspect of the up-to-date control algorithm and a positive surgical outcome.

At 49520, updated control algorithms may be generated. For example, based on the determined correlation, an updated up-to-date control algorithm may be generated. For example, the updated up-to-date control algorithm may be published for a surgical device or a surgical hub to download via an interface. For example, the updated up-to-date control algorithm may be sent to a plurality of surgical hubs.

Autonomous adjustments to control algorithms and/or approaches of a scope, view instruments associated with the scope, and/or a displaying system associated with the scope may be used to configure the devices capture, device operation and/or device display aspects, e.g., to maximize communication data and user control of the displayed data.

Displayed data associated with an instrument may be autonomously adapted based on recorded usage. Autonomous adjustments of a video stream and/or interpretation of a portion of the video stream may be used to adapt system notifications and warnings. Based on detected movement of a tool (e.g., via a camera or a scope), system parameters may be automatically adjusted. In examples, if a device moves closer and in position to start a use sequence (such as cutting with an energy tool), the system may automatically start to get the device ready to perform an associated use task (such as heating the blade, performing safety and/or functional checks, etc.). In examples, if a device moves away from an intended use site (such as near a critical structure) and/or the device is outside the field of view, the device may be placed into a safe mode or may be prevented from continued use.

Adjustments to approaches to tissue(s) may be made based on detected device location and/or detected device use. The method of approach to tissue that the device is using may be video captured. Based on this approach, the user may be informed of different approaches. The system may be automatically attempt to compensate for the poor angle of attack (e.g., associated with the device).

Calibration of control algorithms may be implemented. Autonomous control algorithm calibrations may be implemented so that different devices may operate to a same practical outcome. In an example, linear staplers may measure their corresponding speed (e.g., cutting member advancing speed or staple firing speed) as part of factory data collection. Such speed data may be aggregated against speed data associated other linear staplers. For example, the aggregation may be performed in a remote system, such as remote system 49312, or an edge computing system, such as edge computing device 49502. The updated speed algorithm(s) may be generated and may be pushed to linear staplers for use in a future operation. When used in a surgical procedure, the linear staplers may be able to perform a calibrated approach (e.g., using calibrated speed algorithm(s)) for optimized outcomes. In examples, different linear staplers may run at different firing speeds within some manufacturing limit. This manufacturing difference, for example, via calibration of firing algorithm(s) using firing speed data, may be used as an input for data aggregation/data analysis (e.g., 49402 and 49404 in FIG. 11) to determine optimized algorithmic output of firing speed. Other calibrations (e.g., required calibrations based on factory settings) may be skipped of nor performed (e.g., after optimized algorithms have been determined and other calibrations are no longer needed).

Calibration(s) of control algorithms associated with surgical device(s) may be performed intraoperatively. A surgical device may start a firing. The surgical device, at least based on outcomes during a firing, may adjust (e.g., may be able to) adjust associated control algorithm(s) during a firing and/or between firings. In examples, the surgical device may (e.g., may be able to) detect that it has stalled. The stalled surgical device based on at least on the detection that it has stalled may be able to automatically adjust its force gains (e.g., in an area where it shouldn't have stalled). In examples, an articulation mechanism may degrade over time and may result in less repeatable outcomes. Articulation mechanism may include a mechanism of articulation associated with an end effector, which may include articulation force, articulation angle, articulation direction, and adjustment thereof in the articulation process. Articulation mechanism are described in greater detail in in PCT Patent Application Publication No. WO2018142277A1, titled Robotic Surgical System and Methods for Articulation Calibration, filed Jan. 30, 2018, the disclosure of which is herein incorporated by reference in its entirety. Such a degrading of articulation mechanism may cause the zero position to shift. The surgical device may (e.g., in response) automatically adjust accordingly. For example, the surgical device may automatically adjust based on a visual indication of angle or forces that bias the articulation system during trocar extraction.

Calibration may be performed at regular time intervals. The frequency of Calibration may be determined based on a last known calibration of the system (e.g., time associated with the last known calibration of the system). In an example, a system may (e.g., intentionally) introduce a degree of uncertainty into automated optimization. In examples, the system may be outside of its optimal calibration time window and may still be within acceptable limits for use. As a result, an uncertainty offset may continue to increment over time. A system may make recommendation and/or optimizations based on an associated uncertainty limit. For example, when the system makes recommendations and/or optimizations, it may not be allowed to optimize parameters or settings beyond its associated uncertainty limit(s). The system may perform checks, for example, periodical checks. In an example, the system may perform a calibration check(s) when the system is idle or not operating. In an example, the system may perform calibration check(s) that may be performed automatically at the beginning of surgery and/or if a surgical device is coupled with a surgical system (e.g., robotic surgical system), the surgical device is initialized, or the surgical device is reset.

A system may perform calibration error check(s). For example, the system may perform one or more checks on different areas to confirm if calibration was performed correctly. By assessing data from different areas, the system may determine if the calibration was in fact valid, or if there was another issue within the system, which may have lead to an invalid calibration. Different areas may refer to a set of subsystem components. For example, a lighting or scoping system may execute a sequence with expected outputs to determine if a calibration error is active. In an example, a different subsystem may be utilized to move motors and to check if calibration was performed correctly.

Intra-operative adjustments to surgical procedures may be implemented. Based on surgical decisions that are within a surgeon's control, a system may make adjustment(s) to control algorithms and/or surgical device operation. In examples, a surgeon may clamp a surgical device for a given amount of time. The amount of time may be a portion of a recommended clamping time. The amount of time may be chosen to achieve optimal performance of the surgical device. Based on the available dataset, the surgical device may adjust the speed of firing to optimize the outcome of the stapling and cutting operation accordingly.

The bounds of adjustments to algorithms or adjustments to the device operation may be created to limit surgical operation and may be dynamically changed based on the progression of the surgery. In examples, the surgeon may be firing, a linear stapler across a combination of healthy and diseased tissues. Based on tissue measurements, the linear stapler may be loaded with a specific profile. As the stapler knife and sled transition from the healthy tissue into the diseased tissue, the surgical device limits and parameters may automatically be adjusted to a new profile. In examples, the surgeon may be performing a sleeve gastrectomy on a patient and may have performed the initial firing with a blue cartridge. The stapler, in response to measuring compression time or tissue thickness, may make adjustments to the firing algorithm based on the dataset for blue cartridges. For the next firing, the surgeon may swap to a different cartridge, and as a result, the system may automatically load a new dataset for limits or other parameters within the algorithm or the surgical device.

The invention claimed is:

1. A computing system for autonomous surgical device control algorithm adaptation, the computing system comprising:
    a processor configured to:
        autonomously identify a surgical hub, wherein the surgical hub is autonomously connected to a surgical device type, and wherein the surgical device type comprises a first surgical device and a second surgical device;
        receive a first operation data associated with a first surgical procedure and a second operation data associated with a second surgical procedure, wherein the first operation data is associated with a first aspect of a first control algorithm of the first surgical device, and wherein the second operation data is associated with a second aspect of a second control algorithm of the second surgical device;
        receive a first outcome data associated with the first surgical procedure and a second outcome data associated with the second surgical procedure;
        determine that each of the first control algorithm of the first surgical device and the second control algorithm of the second surgical device is an up-to-date control algorithm associated with the surgical device type;
        generate an aggregation data based on at least the first operation data, the second operation data, the first outcome data, and the second outcome data;
        based on at least the aggregation data, determine a correlation between an aspect of the up-to-date control algorithm and an outcome data, wherein to determine the correlation between the aspect of the up-to-date control algorithm and the outcome data comprises the processor being configured to determine a first correlation between the aspect of the up-to-date control algorithm and a negative surgical outcome and a second correlation between the aspect of the up-to-date control algorithm and a positive surgical outcome;
        based on the determined correlation, generate an updated up-to-date control algorithm, wherein the updated up-to-date control algorithm is configured to replace at least one coefficient associated with the first control algorithm or the second control algorithm with at least one updated coefficient associated with the updated up-to-date control algorithm, at least one operating parameter associated with the first control algorithm or the second control algorithm with at least one updated operating parameter associated with the updated up-to-date control algorithm, at least one limit associated with the first control algorithm or the second control algorithm with at least one updated limit associated with the updated up-to-date control algorithm, at least one setting associated with the first control algorithm or the second control algorithm with at least one updated setting associated with the updated up-to-date control algorithm, or at least one power algorithm associated with the first control algorithm or the second control algorithm with at least one updated power algorithm associated with the updated up-to-date control algorithm; and
        transmit the updated up-to-date control algorithm to the first surgical device and the second surgical device via the surgical hub, wherein the updated up-to-date control algorithm is configured to operate the first surgical device and the second surgical device and to provide an improved surgical outcome.

2. The computing system of claim 1, wherein the computing system is one of an edge computing system or a cloud computing system, wherein the first outcome data associated with the first surgical procedure is received from the surgical hub or a surgical visualization device, and wherein the outcome data comprises the first outcome data and the second outcome data.

3. The computing system of claim 1, wherein the first operation data is received from the first surgical device and the second operation data is received from the second surgical device.

4. The computing system of claim 1, wherein the first operation data and the second operation data are received from the surgical hub.

5. The computing system of claim 1, wherein to transmit the updated up-to-date control algorithm comprises the processor being further configured to:
publish the updated up-to-date control algorithm to at least one of the first surgical device, the second surgical device, or the surgical hub; and
cause the at least one of the first surgical device, the second surgical device, or the surgical hub to download the updated up-to-date control algorithm via an interface.

6. The computing system of claim 1, wherein the surgical hub is a first surgical hub, wherein the first operation data is received from the first surgical hub and the second operation data is received from a second surgical hub, wherein the first surgical hub and the second surgical hub are different, and wherein the determined correlation comprises the first correlation between the aspect of the up-to-date control algorithm and the negative surgical outcome and the second correlation between the aspect of the up-to-date control algorithm and the positive surgical outcome.

7. A smart surgical device, the smart surgical device comprising:
a processor configured to:
autonomously identify a surgical hub that is connected to the smart surgical device;
send, to the surgical hub, a first operation data associated with a first surgical procedure and a second operation data associated with a second surgical procedure, wherein the first operation data is associated with a first aspect of a control algorithm of the smart surgical device, and wherein the second operation data is associated with a second aspect of the control algorithm of the smart surgical device;
send, to the surgical hub, a first portion of a first outcome data associated with the first surgical procedure and a second portion of a second outcome data associated with the second surgical procedure;
receive, from the surgical hub, an updated control algorithm associated with the smart surgical device, wherein the updated control algorithm is based at least on an aggregation data and a correlation between an aspect of the updated control algorithm and an outcome data, wherein the aggregation data comprises at least the first operation data, the second operation data, the first outcome data, and the second outcome data, and wherein the correlation between the aspect of the updated control algorithm comprises at least one of a first correlation between the aspect of the control algorithm and a negative surgical outcome and a second correlation between the aspect of the control algorithm and a positive surgical outcome;
determine the updated control algorithm is more up-to-date than the control algorithm that is installed on the smart surgical device;
replace the control algorithm with the updated control algorithm, wherein to replace the control algorithm with the updated control algorithm comprises the processor being configured to replace at least one coefficient associated with the first aspect of the control algorithm or the second aspect of the control algorithm with at least one updated coefficient associated with the updated control algorithm, at least one operating parameter associated with the first aspect of the control algorithm or the second aspect of the control algorithm with at least one updated operating parameter associated with the updated control algorithm, at least one limit associated with the first aspect of the control algorithm or the second aspect of the control algorithm with at least one updated limit associated with the updated control algorithm, at least one setting associated with the first aspect of the control algorithm or the second aspect of the control algorithm with at least one updated setting associated with the updated control algorithm, or at least one power algorithm associated with the first aspect of the control algorithm or the second aspect of the control algorithm with at least one updated power algorithm associated with the updated control algorithm; and
operate using the updated control algorithm and provide an improved surgical outcome.

8. The smart surgical device of claim 7, wherein the processor is configured to:
download, from the surgical hub, the updated control algorithm.

9. A method for a computing system for autonomous surgical device control algorithm adaptation, the method comprising:
autonomously identifying a surgical hub, wherein the surgical hub is autonomously connected to a surgical device type, and wherein the surgical device type comprises a first surgical device and a second surgical device;
receiving a first operation data associated with a first surgical procedure and a second operation data associated with a second surgical procedure, wherein the first operation data is associated with a first aspect of a first control algorithm of the first surgical device, and wherein the second operation data is associated with a second aspect of a second control algorithm of the second surgical device;
receiving a first outcome data associated with the first surgical procedure and a second outcome data associated with the second surgical procedure;
determining that each of the first control algorithm of the first surgical device and the second control algorithm of the second surgical device is an up-to-date control algorithm associated with the surgical device type;
generating an aggregation data based on at least the first operation data, the second operation data, the first outcome data, and the second outcome data;
based on at least the aggregation data, determining a correlation between an aspect of the up-to-date control algorithm and an outcome data, wherein determining the correlation between the aspect of the up-to-date control algorithm and the outcome data comprises determining a first correlation between the aspect of the up-to-date control algorithm and a negative surgical outcome and a second correlation between the aspect of the up-to-date control algorithm and a positive surgical outcome;
based on the determined correlation, generating an updated up-to-date control algorithm, wherein the updated up-to-date control algorithm replaces at least one coefficient associated with the first control algorithm or the second control algorithm with at least one updated coefficient associated with the updated up-to-date control algorithm, at least one operating parameter associated with the first control algorithm or the second control algorithm with at least one updated operating parameter associated with the updated up-to-date control algorithm, at least one limit associated with the first control algorithm or the second control algorithm with at least one updated limit associated with the updated up-to-date control algorithm, at least one setting associated with the first control algorithm or the second control algorithm with at least one updated setting associated with the updated up-to-date control algorithm, or at least one power algorithm associated with the first control algorithm or the second control algorithm with at least one updated power algorithm associated with the updated up-to-date control algorithm; and transmitting the updated up-to-date control algorithm to the first surgical device and the second surgical device via the surgical hub, wherein the updated up-to-date control algorithm is configured to operate the first surgical device and the second surgical device and to provide an improved surgical outcome.

10. The method of claim 9, wherein the computing system is one of an edge computing system or a cloud computing system, and wherein the first outcome data associated with the first surgical procedure is received from the surgical hub or a surgical visualization device.

11. The method of claim 9, wherein the first operation data is received from the first surgical device and the second operation data is received from the second surgical device.

12. The method of claim 9, wherein the first operation data and the second operation data are received from the surgical hub.

13. The method of claim 9, wherein transmitting the updated up-to-date control algorithm further comprises:

publishing the updated up-to-date control algorithm to at least one of the first surgical device, the second surgical device, or the surgical hub; and cause the at least one of the first surgical device, the second surgical device, or the surgical hub to download the updated up-to-date control algorithm via an interface.

14. The method of claim 9, wherein the surgical hub is a first surgical hub, wherein the first operation data is received from the first surgical hub and the second operation data is received from a second surgical hub, wherein the first surgical hub and the second surgical hub are different.

15. The method of claim 9, wherein the determined correlation comprises the first correlation between the aspect of the up-to-date control algorithm and the negative surgical outcome and the second correlation between the aspect of the up-to-date control algorithm and the positive surgical outcome.

16. The method of claim 9, wherein the outcome data comprises the first outcome data and the second outcome data.

17. The computing system of claim 1, wherein the first and second surgical device comprise at least one of a surgical endocutter or a stapling device, and wherein the first and second operation data are associated with at least one of energy source information, cutting operation information, stapling operation information, a knob orientation, a body orientation, a body position, anvil jaw force information, reload alignment information, or slot management information.

18. The method of claim 9, wherein the first and second surgical device comprise at least one of a surgical endocutter or a stapling device, and wherein the first and second operation data are associated with at least one of energy source information, cutting operation information, stapling operation information, a knob orientation, a body orientation, a body position, anvil jaw force information, reload alignment information, or slot management information.

* * * * *